INVENTORS
JOHN E. THRON
THOMAS O. HOLTEY

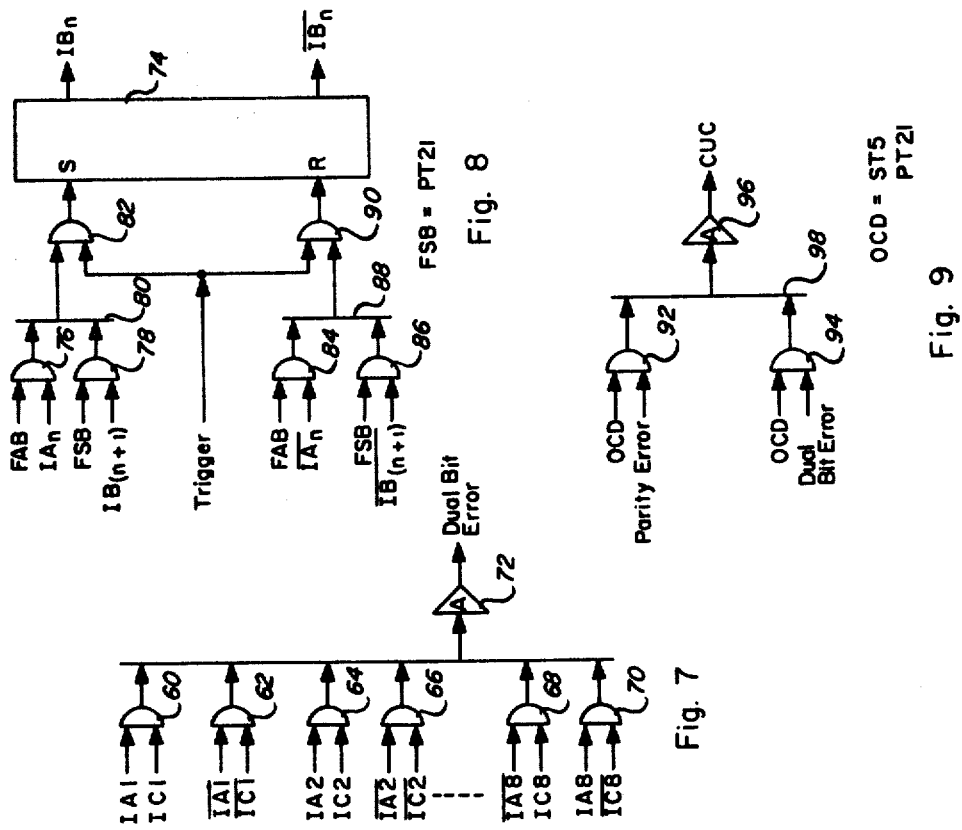
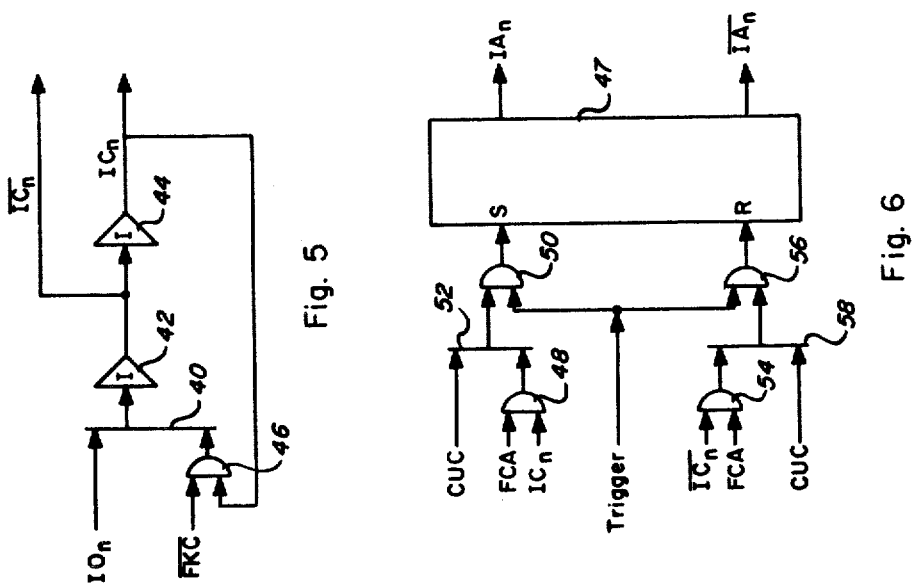

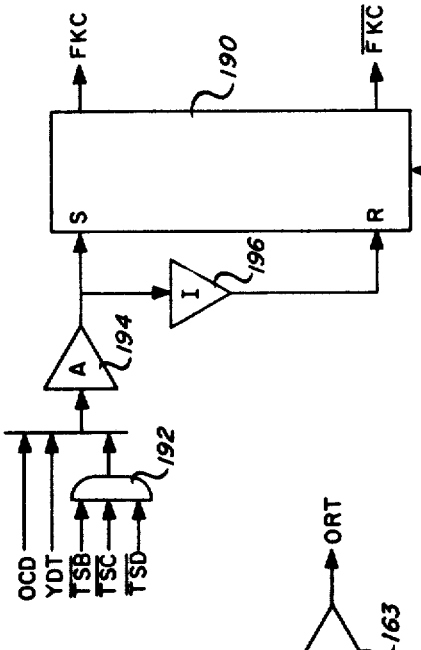
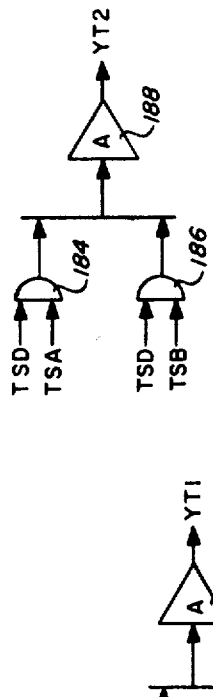
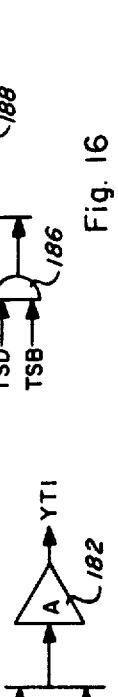
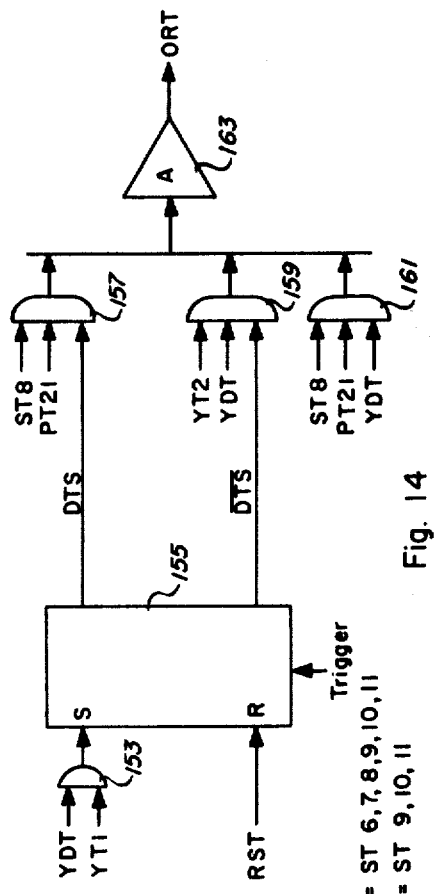
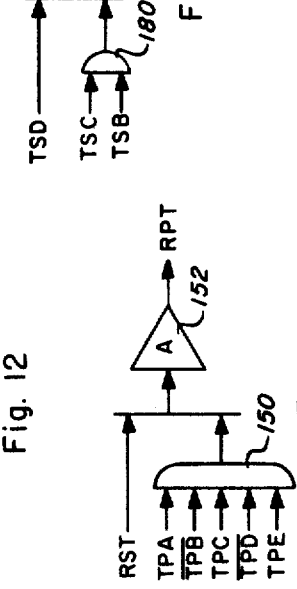

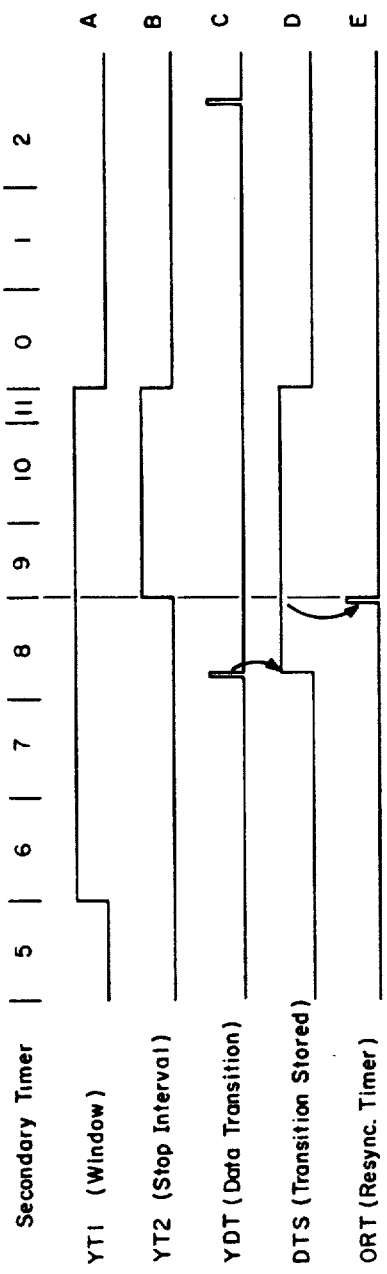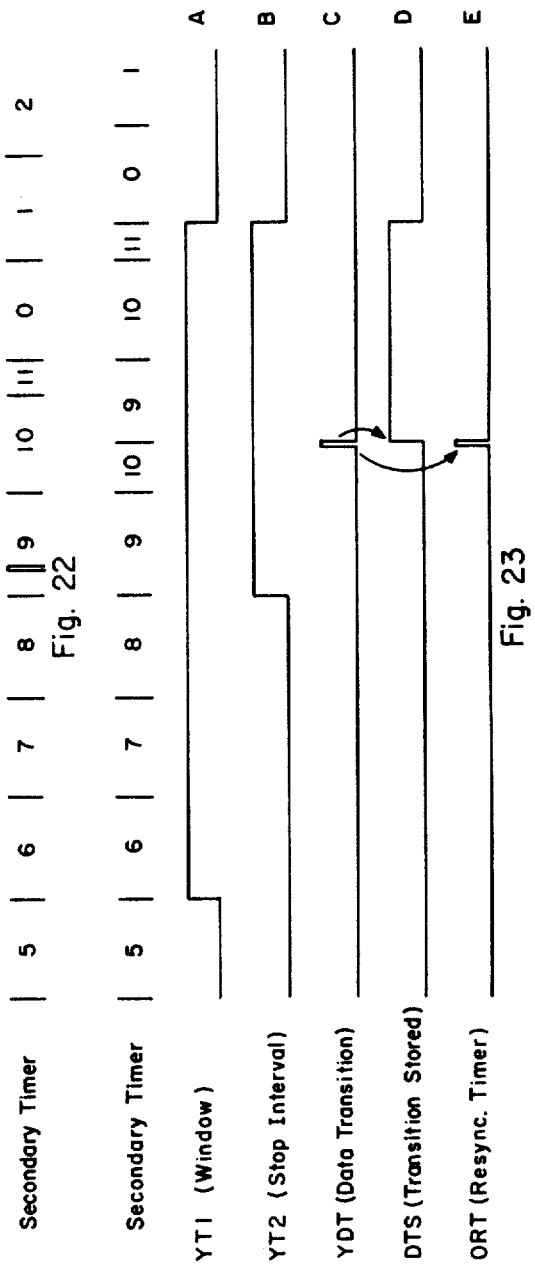
Fig. 21
Fig. 22
Fig. 23

United States Patent Office 3,399,382
Patented Aug. 27, 1968

3,399,382
DATA TRANSFER SYSTEM
John E. Thron, Cambridge, and Thomas O. Holtey, Newton Lower Falls, Mass., assignors to Honeywell Inc., a corporation of Delaware
Filed May 7, 1965, Ser. No. 454,074
16 Claims. (Cl. 340—172.5)

ABSTRACT OF THE DISCLOSURE

Data which is asynchronously received by a buffer from an input station is transferred through the buffer to an output station under the control of a predetermined count of a single timing source. Both the stations operate at the same nominal rate and synchronization therebetween is effected by advancing or retarding such count in accordance with timing information derived from the asynchronously arriving data. In the absence of such timing information derived from the data at said input modification thereby making it appear as if both stations were operating at the same nominal rate.

---

The present invention relates in general to a new and improved data transfer technique, in particular to a technique for controlling the transfer of data between an input station and an output station in accordance with timing information derived from the data at said input station, wherein at least one station operates at a data rate variable with respect to the data rate of the other station.

Although it is not so limited, the present invention is specifically applicable to a data transfer system wherein the input station constitutes an optical document reader capable of reading data in the form of black and white code bars simultaneously from a number of channels of a document, e.g., from a document of the kind shown in a co-pending application of Earl E. Masterson, S.N. 334,270, which is assigned to the assignee of the present application. In a specific embodiment of the invention each data character may be represented by a dual bit (di-bit) code, arranged in columnar format with a single di-bit per channel. The data read out in parallel from the several channels is transferred to the output station, which may constitute a commercially available Teletype printer capable of accepting data in serial format only.

Using the data handling rate of the Teletype printer as a reference, the cost and complexity of the overall data transfer system may be optimized by holding the document reader to the same, or nearly the same, data rate. This may be implemented by controlling the speed of the document reader transport portion, which may be similar to that disclosed in the aforesaid co-pending application. Any speed-up of the document reading rate above this level, even if only for a portion of the overall data transfer cycle, introduces the need for buffer storage on a relatively large scale. Such operation further requires means for timing the transfer of data from the document reader to the buffer, as well as means for independently timing the transfer of data from the buffer to the printer. This technique is in comon use in present day data transfer systems of this type and materially increases their cost and complexity. The cost of the additional buffer storage, as well as the cost of a pair of independent timing sources, must be added to the cost of the refinements in both circuitry and transport mechanism, which are necessary to enable the document reader to operate at the higher rate. Considering the relatively poor utilization of the overall data transfer cycle, the additional cost can be justified only where multiplexing is carried out, e.g., where a single document reader supplies data to a number of Teletype printers.

In an alternative technique employed in presently available data transfer systems, the document reader is consistently operated at a rate much lower than that of the Teletype printer to enable the latter to accept the incoming data under worst-case conditions. The required buffer storage capacity is thereby reduced, but not eliminated since the Teletype printer is a cyclically operating machine. More importantly, however, the overall data throughput is reduced. This is a matter of serious concern where the data transfer is tied to the operation of a modern data processing system, since the equipment under discussion operates at data rates considerably lower than most other components of such a data processing system.

Accordingly, it is the primary object of the present invention to provide a data transfer system which is not subject to the foregoing disadvantages.

It is another object of the present invention to provide an improved data transfer system wherein the data rate of the input station is nominally equal to the data rate of the output station.

It a is further object of the present invention to provide a simple and inexpensive data transfer system requiring relatively little buffer storage between the input and output station and employing a single timing source which is compensated for relative variations in the nominally equal data rates of the input and output stations.

Where document space is important, the use of a separate clock track becomes undesirable. If the documents are prepared in bar code on a high-speed printer, the accuracy requirements posed by the printing of the clock track may be difficult to meet in practice. While self-clocked readout of data is common today, it is frequently unsatisfactory, particularly where the optical readout of printed documents is concerned. Not only is the accuracy of printing on a document subject to variation, but variations are also encountered in the relative blackness of the printed code bars and in the speed of response of the recognition circuitry upon reading transitions from white to black. Variations in the response time may, of course, occur between different document readers due to the foregoing reasons and because of different document moving rates. Variations may also be occasioned by document skewing, or by humidity changes and their effect on the position of the transitions on the document. On occasion, code bars may be missing altogether, or be sufficiently obscured so as not to be recognizable. Accordingly, an entire data character may pass without a detectable transition from which a clock pulse can be generated. In the past, the reliability of data transfer systems employing self-clocked optical readout was adversely affected by the foregoing factors.

It is still another object of the present invention to provide a reliable data transfer system employing a timing source which is controlled by clocking information derived from the data to be transferred.

It is still a further object of the present invention to provide a reliable self-clocked data transfer system employing a single timing source, the count of which is periodically advanced or retarded in accordance with the relative data rates of the input and output stations in order to force synchronism therebetween.

Each transfer of data is ordinarily accompanied by a checking operation. The parity check, which is customarily associated with binary digital information, is only of limited value owing to the possibility of complementary errors which are not detectable with this technique.

It is an additional object of the present invention to provide a fully checked data transfer system employing a complementary dual-bit code, wherein each transfer operation of a data character is accompanied by a character parity check, as well as by a dual-bit check of each binary character digit.

As previously explained, in a specific application of the subject data transfer system, each character may be represented by a plurality of di-bits, respectively positioned in different channels of the document in a manner enabling them to be read out in parallel. The output station may take the form of a printer capable of accepting data in serial format only. The conversion of data from parallel to serial format must be carried out within the constraints placed on the operation of the overall system. In the past, such format conversion frequently entailed a slow-down of the overall data transfer rate.

It is yet another object of the present invention to provide a reliable, self-clocked, and fully checked data transfer system, employing a single timing source which is compensated for relative variations of the nominally equal data input and data output rates, wherein the data format is changed without any decrease in the overall data transfer rate.

In a preferred embodiment of the invention which forms the subject matter of the present application, the document reader optically reads bar-coded data from parallel channels of a document, checks for errors and serializes the resultant data. The checking operation includes both a parity check as well as a dual-bit check which is permitted by the complementary, redundant dual-bit code format used to represent each data character on the document. Uncorrectable errors are marked with an error symbol. A commercially available Teletype printer constitutes the output station. Both stations operate at the same or nearly the same nominal data rate.

Synchronizaion between the document reader and the printer is accomplished by periodically adjusting the count of a timing source in the form of a binary counter, in accordance with clock pulses generated from the data read out from the document. Once the data has been asynchronously transferred from the document reader to a buffer, the counter controls the progress of the data both within the buffer and between the buffer and the Teletype printer. While the data rate of the printer cannot be increased substantially beyond the nominal rate, it can be decreased in accordance with data received by it under the control of the binary counter.

The event used as a clocking signal is the occurrence of the first white-to-black transition in the first half of a dual-bit character. A nominal time for the occurrence of this event is determined by a predetermined state of the binary counter. Depending on the occurrence of the clocking transition, earlier or later than the nominal time, it is either stored first and used as early as possible, or it is used immediately to force the counter to assume the nominal state. The count is thus moved either forward or backward, unless a transition occurs outside a predetermined time bracket and can be safely ignored. Each transition within the time bracket thus establishes a timing pattern for the processing of the associated data, which timing pattern may be changed by the subsequently arriving transition. If a character is obliterated or obscured so that no clocking transition occurs, the system reacts as if a clocking transition had occurred at the nominal time.

These and other objects of the present invention, together with further features and advantages thereof, will become apparent from the following detailed specification, when read in conjunction with the accompanying drawings, in which:

FIGURE 5 illustrates in greater detail the C register shown in FIGURE 3;

FIGURE 6 illustrates in greater detail the A register shown in FIGURE 3;

FIGURE 7 illustrates in greater detail the comparator shown in FIGURE 3;

FIGURE 8 illustrates in greater detail the B register shown in FIGURE 3;

FIGURE 9 illustrates the generation of an error symbol;

FIGURE 12 illustrates schematically the generation of a secondary timer increment signal;

FIGURE 13 illustrates schematically the generation of a primary timer reset signal;

FIGURE 14 illustrates schematically the generation of a timer resynchronizing signal;

FIGURE 15 illustrates schematically the generation of "window" signal YT1;

Figure 1:
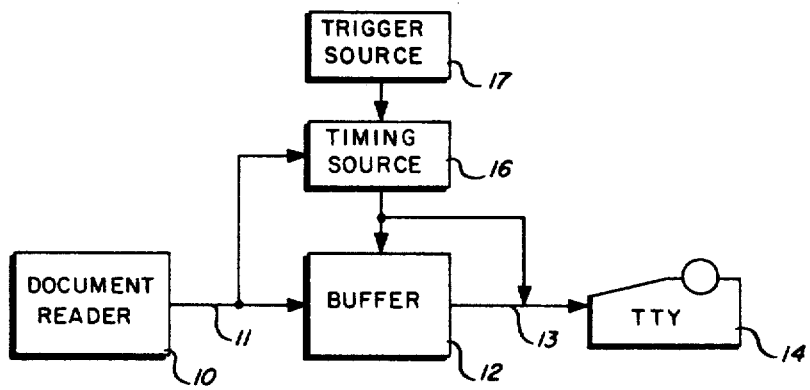
FIGURE 1 illustrates a preferred embodiment of the invention in simplified block diagram form.
Figure 2:
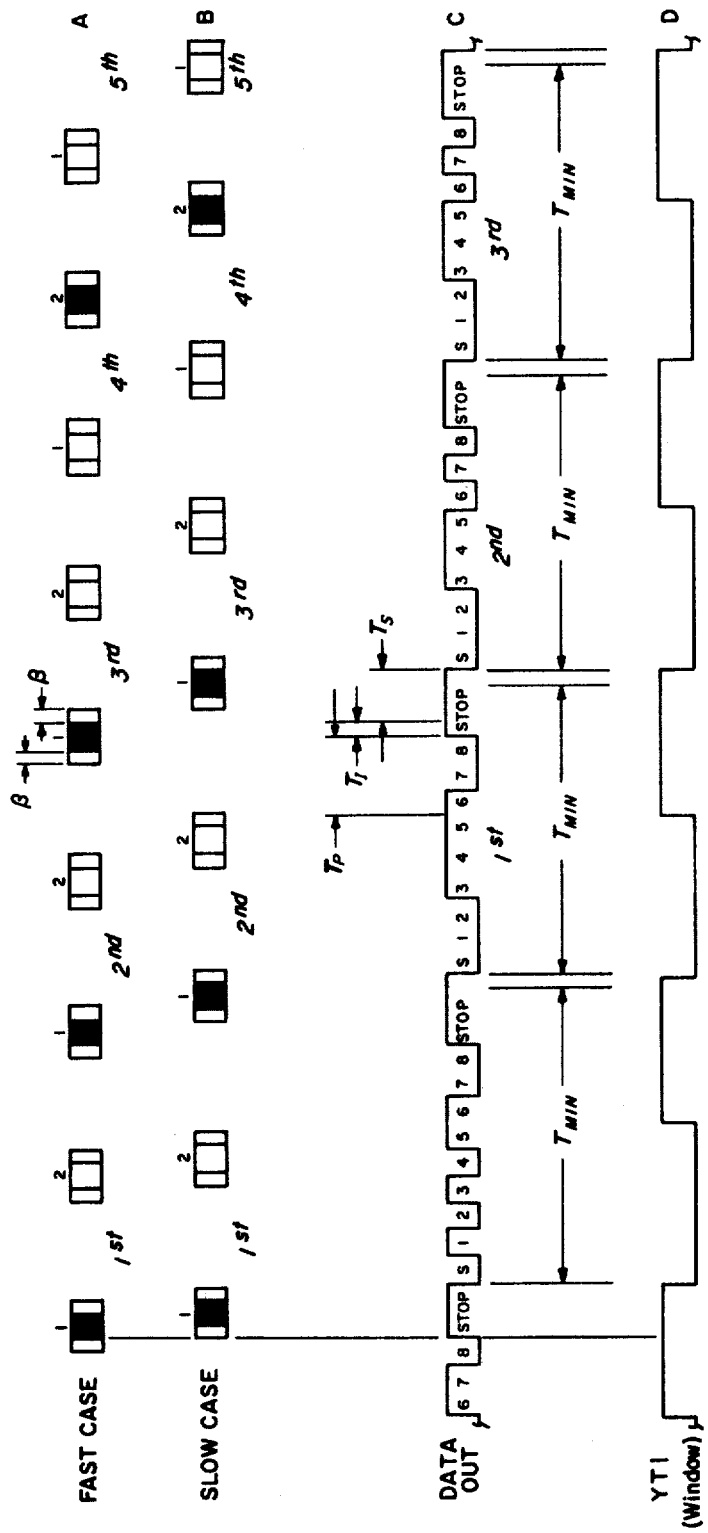
FIGURE 2 illustrates the relationship of the data rates between the document reader and the Teletype printer.
Figures 1, 18:
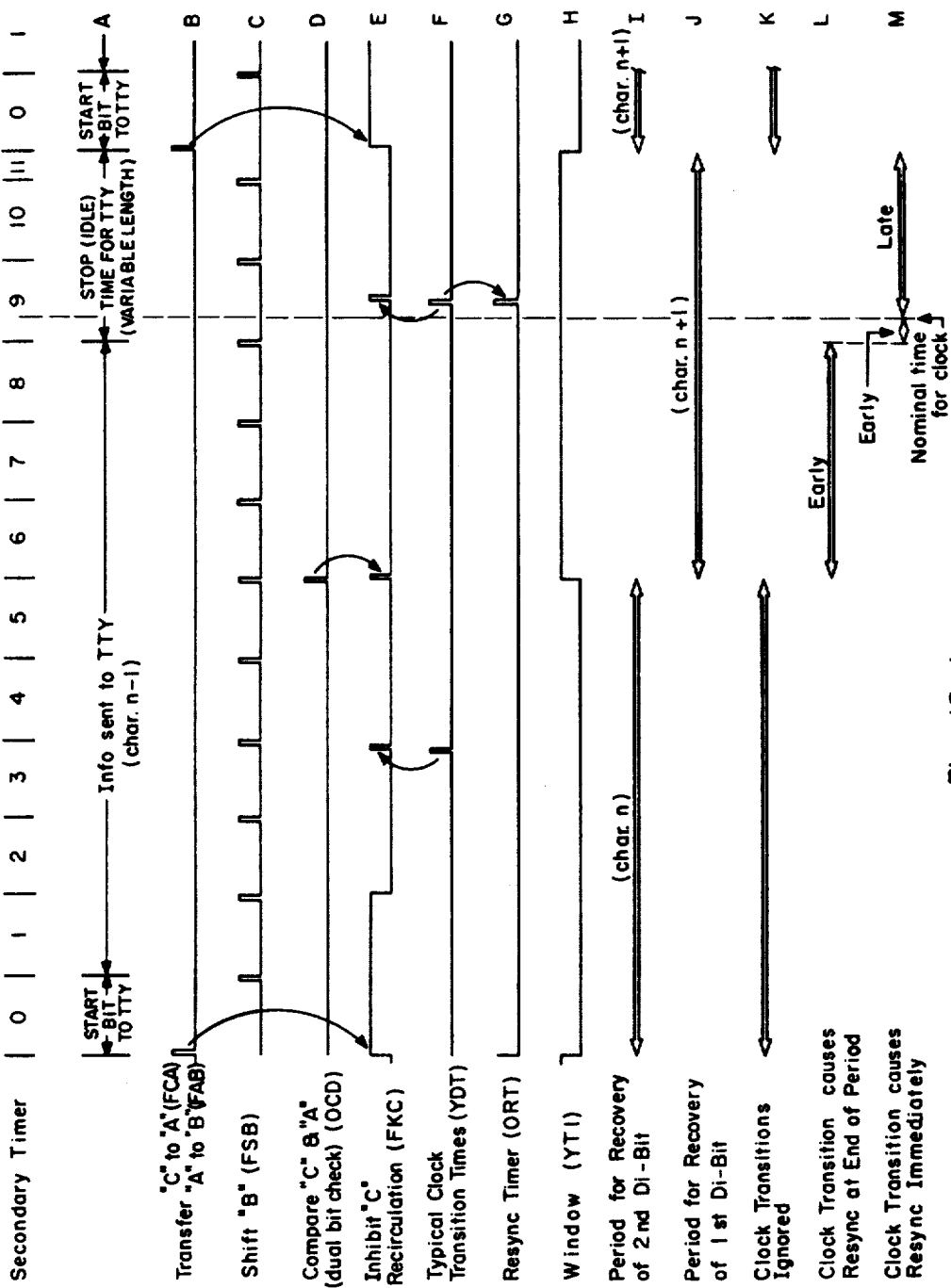
Figures 2, 18:
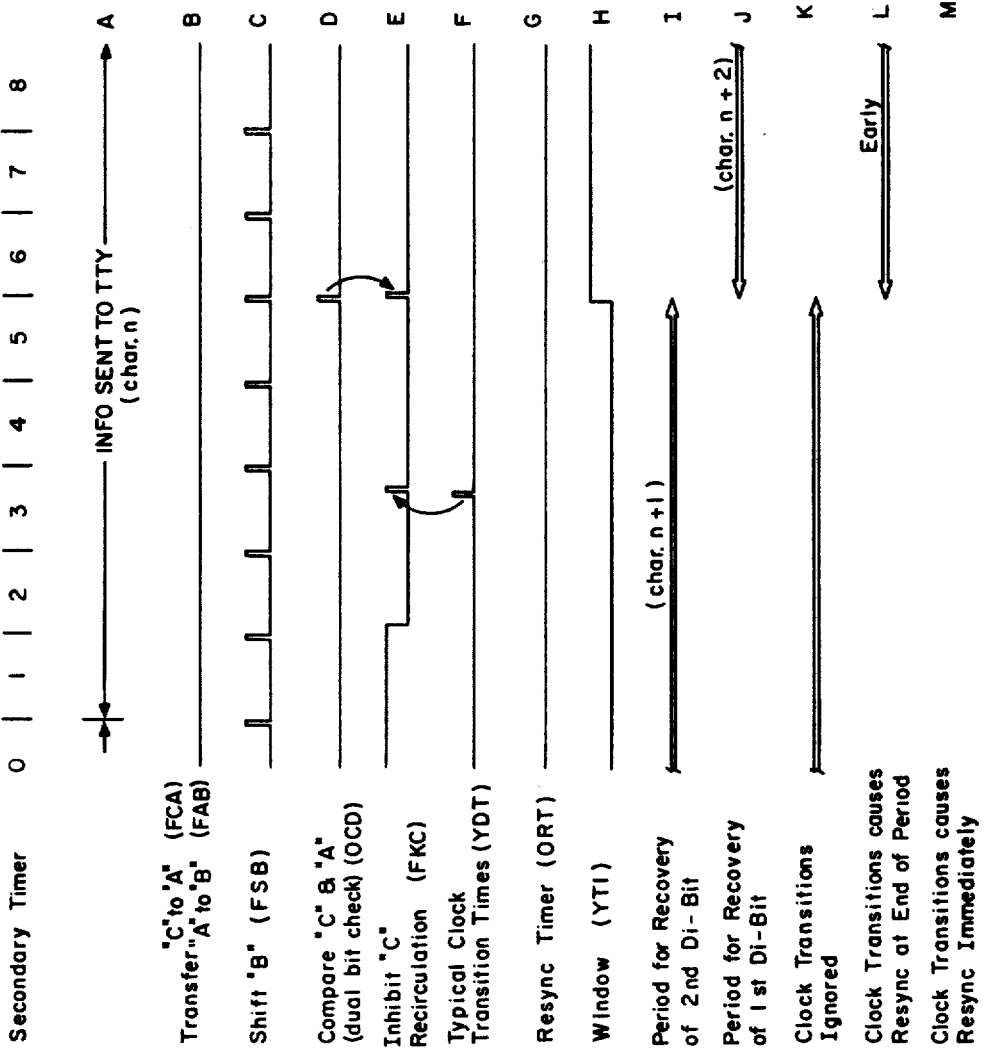
Figure 19:
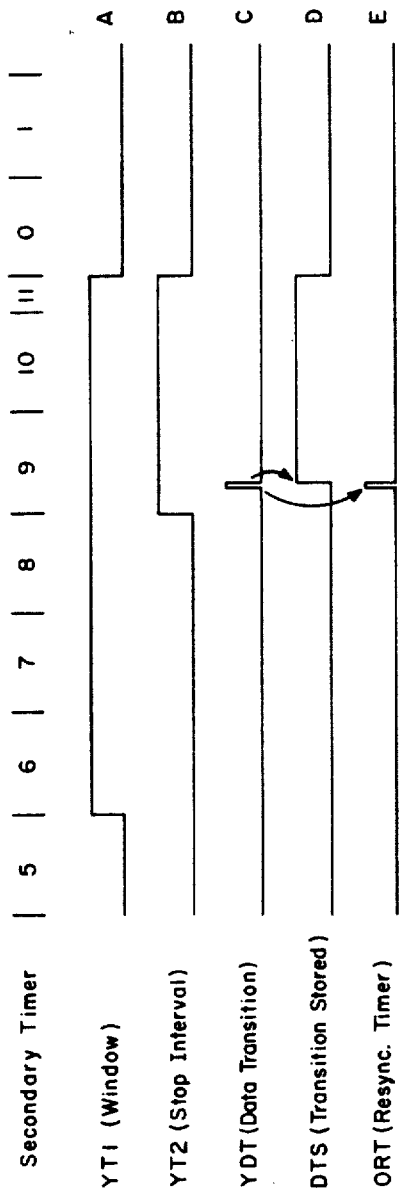
Figure 20:
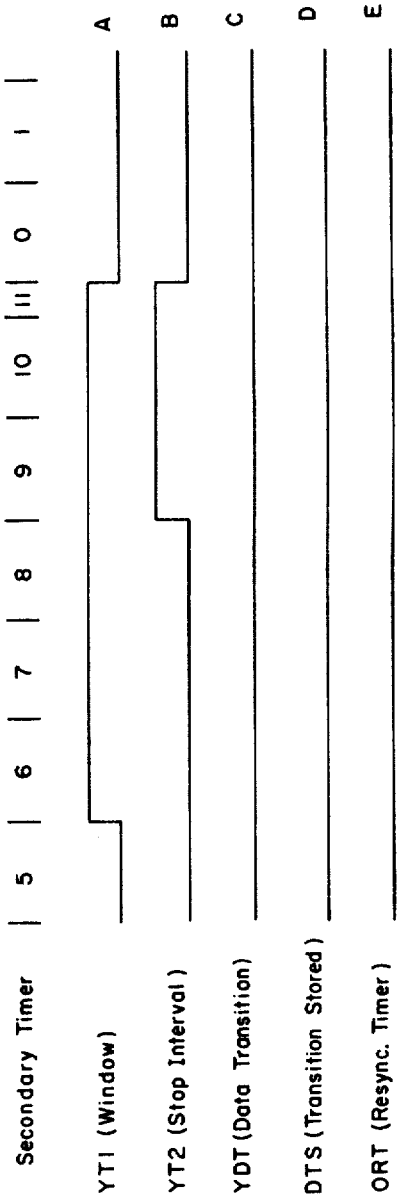

FIGURE 16 schematically illustrates the generation of a YT2 signal;

FIGURE 17 schematically illustrates the generation of a C register reset signal;

FIGURES 18-1 and 18-2 jointly illustrate various waveforms useful in forming an understanding of the operation of the apparatus illustrated in the preceding figures;

FIGURE 19 illustrates in greater detail a portion of FIGURE 18 for the case of a nominal transition;

FIGURE 20 illustrates in greater detail a portion of FIGURE 18 for the case of a missing transition;

FIGURE 21 illustrates in greater detail a portion of FIGURE 18 for the case of an early transition;

FIGURE 22 shows a nominal secondary timer scale; and

FIGURE 23 illustrates in greater detail a portion of FIGURE 18 for the case of a late transition.

With reference now to the drawings, FIGURE 1 illustrates in block diagram form the data transfer system which forms the subject matter of the present invention. An imput station in the form of a document reader 10 is coupled to a buffer 12, data being asynchronously read out to the latter by way of the path 11. The buffer 12, by way of a path 13, is coupled to an output station in the form of a Teletype printer 14, which is further designated by the letters TTY. In a preferred embodiment of the invention the path 11 is a multi-channel path, data being read out in parallel from the document reader, while the path 13 is a single channel path which permits the data to be read serially to the Teletype printer.

A timer 16 is operated from a trigger source 17 and is further controlled by the data rate of the document reader 10, as indicated schematically by its connection to the path 11. The trigger source 17 may constitute a tuning fork oscillator and thus functions as a reference standard. The timer 16 controls the operation of the buffer 12, as well as the transfer of data between the buffer and the printer 14, by way of the path 13. For the purpose of the present explanation, the Teletype printer 14 is assumed to operate at its maximum data rate, and the document reader is assumed to operate at a nominal rate equal to or very slightly below the maximum rate. Thus, both stations are substantially capable of handling the same nominal number of data characters per second. As will be explained in greater detail hereinbelow, the timer 16, which controls the sequence of operations from the time the data enters the buffer 12, is periodically resynchronized in accordance with the data rate of the document reader in order to compensate for deviations from the nominal data rate.

FIGURE 2 illustrates the relationship of the data rates of the document reader 10 and of the Teletype printer 14 discussed above in connection with FIGURE 1. Only a single channel is shown in FIGURES 2A and 2B, although it will be understood that a data character is represented in a plurality of channels on the document from which it is read out in parallel. Each code bar illustrated represents a single binary digit, black being representative of binary "1" and white of binary "0." During readout, a transition from white to black is sensed as a "1," while black followed by white indicates a "0." Each channel must indicate black for a certain interval during the reading of a character and then white for a certain interval. White followed by white, or black followed by black indicates an error in the same manner as the failure of a parity check.

A data character is printed on the document as a multichannel array of bar code representations. Each bar code representation consists of a first portion representative of the actual bit and spaced therefrom, in the same channel, a second portion representative of the bit complement. An additional channel contains a parity check bit and its complement for each character. Successive pairs of bar code representations are denoted as 1st, 2nd, 3rd, etc. in FIGURES 2A and 2B, to indicate successive data characters. In accordance with the foregoing explanation, the first bar code representation in FIGURES 2A and 2B is seen to be a binary "1," the left-hand or first portion being black and the second portion being white. The second and third bar code representations are similar binary "1's," while the fourth bar code representation is seen to be a binary "0." It is a requirement that in the first portion of a print position in which a legitimate character is encoded, at least one channel will indicate a binary "1." With an even number of data channels, parity may be chosen as odd so that the parity bit fulfills the foregoing requirement. As previously explained, in the present invention data readout is self-clocked, i.e. timing information is derived from the data itself rather than from a separate printed or mechanically generated clock channel output. The transition from white to black in one or more of the data channels, which is guaranteed by a valid character code, is used to generate a clock pulse for controlling the subsequent sequence of events.

As previously discussed in connection with FIGURE 1, the data rate of the Teletype printer establishes the nominal data rate of the document reader. The data rate of the reader may vary due to a variety of causes. For example, variations in document surface speed may occur both in a given document reader and from one reader to another. Such variations are of a cumulative nature and may be measured by the factor $\alpha$ which is defined as the ratio of minimum to maximum document velocity. Non-cumulative variations may affect the data rate due to variations in the spacing of the bar code representations occasioned by variations in the strike position of the print hammers of the high-speed printer on which the documents are originally prepared. Further non-cumulative variations may occur due to document skewing during high-speed printing and/or during readout on the document reader. The expansion or contraction of the width of the printed code bars due to humidity, and the legitimate "blackness" sensed by the optical detection and threshold circuitry are further factors which may introduce variations of the data rate. The factor $\beta$ may be defined as the distance a document may move, at one inch per second, during which white-to-black transitions in the representation of the character may appear to occur. Thus, data which is indicated by the margins to either side of a code bar in FIGURE 2A, as illustrated in connection with the third character, is a measure of the "jitter" or non-cumulative variation of the data rate.

Within limits, all of the above-discussed variations must be tolerated and taken into consideration by the clocking logic of a self-clocked system. For example, in a practical embodiment of the present invention, if the transport mechanism of the document reader permits no speed variation, the transitions from white to black within a character may vary over a 24 millisecond interval, while if there is "jitter," the surface velocity may vary from 0.9 to 1.0 inch per second, i.e. ±5%. At the maximum document velocity the data rate may be 10 characters per second. In a practical embodiment of the invention, reasonable values for $\alpha$ and $\beta$ may be: $\alpha=.947$, $\beta=.010$. This would mean "jitter" must not exceed 10 mils, i.e. 10 milliseconds at one inch per second, and that the speed must be restricted to 0.975 inch per second ±.025 inch per second, i.e. ±2.5%.

FIGURE 2A illustrates a case wherein the document transport moves the document at greater than the prescribed document surface velocity so as to produce a data rate in excess of that of the Teletype printer. It will be understood that, unlike the "jitter" condition discussed above, this produces a cumulative variation of the data rate and will lead to the printing of error indications if sustained. FIGURE 2B illustrates a case wherein the surface velocity of the document cumulatively produces a data rate less than that of the Teletype printer. As will become clear from the discussion hereinbelow, the latter difference in the data rates of the input and output stations is readily compensated for in the present invention by extending the variable stop interval in FIGURE 2C.

The waveform shown in FIGURE 2C represents the data rate of the Teletype printer which, as explained above, is taken as a reference to establish the nominal data rate. As previously discussed, the Teletype printer 14 in FIGURE 1 is capable of accepting data in serial format only. If it be assumed that 8 bits are required to set up the Teletype printer for the printing of a single character, a serial stream of 8 bits, as indicated in FIGURE 2C, is periodically applied to the printer. For the purpose of the present explanation, all positive waveform levels are taken to represent binary ONE's, and all negative waveform levels represent binary ZERO's. Preceding each such data stream is a start bit which is seen to be "0" and which is designated by the letter S in the waveform of FIGURE 2C. The start bit operates to condition the printer for the subsequently arriving data. Following the 8th bit, there is a variable-length stop interval during which the printer is idle with regard to the receipt of data, preparatory to the arrival of the next data character. All or part of the actual printing may take place during this stop interval.

It will be noted that the 8 data bits for each character sent to the printer are read out from the document reader substantially simultaneously, but are received by the printer in 8 equally timed intervals. To the stop interval there are allotted two and a fraction of the aforesaid periodic intervals, while the start interval, during which the start bit is sent to the printer, takes up a single interval.

The timing relationship between the data represented in FIGURES 2A and 2B and that represented in FIGURE 2C, is established by the designation of the characters as 1st, 2nd, 3rd, etc. in all three figures. FIGURE 2C is applicable to a nominal data rate, which would lie between that shown in FIGURES 2A and 2B. The actual data shown in FIGURE 2C, being derived from all of the channels on the document, bears no relationship to that shown in FIGURES 2A and 2B, each of which represents only a single channel. The interval $T_{min}$ represents the minimum allowable time for the delivery of a complete character, consisting of seven data bits and a parity bit, to the Teletype printer. The interval $T_s$ represents the minimum stop interval required by the Teletype printer following the transmission of the character to set up for the subsequently arriving character. $T_s+T_1$ are representative of the nominal length of a stop interval, i.e. of the length of the stop interval at the nominal document reader transport speed of 0.975 inch per second, as discussed above. Under nominal operating conditions the timing source 16 in FIGURE 1, which determines the time intervals indicated by numbers in the waveform of FIGURE 2C, will not be resynchronized.

FIGURE 2D illustrates the function YT1 which is sometimes referred to as a "window." Provided at least one transition of the first half of each group of multichannel code bar representations of a data character occurs within the duration of the window, i.e. within the the duration of a positive YT1 pulse, a valid clock pulse is generated. In the absence of a transition within the "window" interval, the previously derived clock pulse governs. It will be noted that the duration of the positive YT1 pulse in FIGURE 2D is equivalent to the sum of the periods $T_p+T_i+T_s$. As previously explained, in the present invention the timing source is re-synchronized in accordance with the difference between the data rate of the document reader and the nominal data rate. If a transition occurs at the boundary between the periods $T_i$ and $T_s$ in FIGURE 2C, data is being read out at the nominal rate and no re-synchronization of the timing source is required. If a transition occurs prior to the interval $T_p$, it is disregarded as being outside the "window" interval.

If a transition occurs during the interval $T_p$, it is stored and a clock pulse is generated at the beginning of the stop interval in FIGURE 2C. The latter condition is indicated for FIGURE 2A, specific reference being made to the first code bar of the third character. In such a case, the timing source is re-synchronized at the beginning of the stop period by being forced forward to the nominal time, as defined by the boundary between the periods $T_i$ and $T_s$. If a transition occurs during the stop interval, but before the nominal clock time, re-synchronization occurs immediately by forcing the timing source forward. If the transition occurs after the nominal clock time but during the stop interval, such as is shown for the first code bar of the third character in FIGURE 2B, re-synchronization takes place at once by forcing back the timing source. A transition after the stop interval is ignored as being outside the "window."

Figure 3:
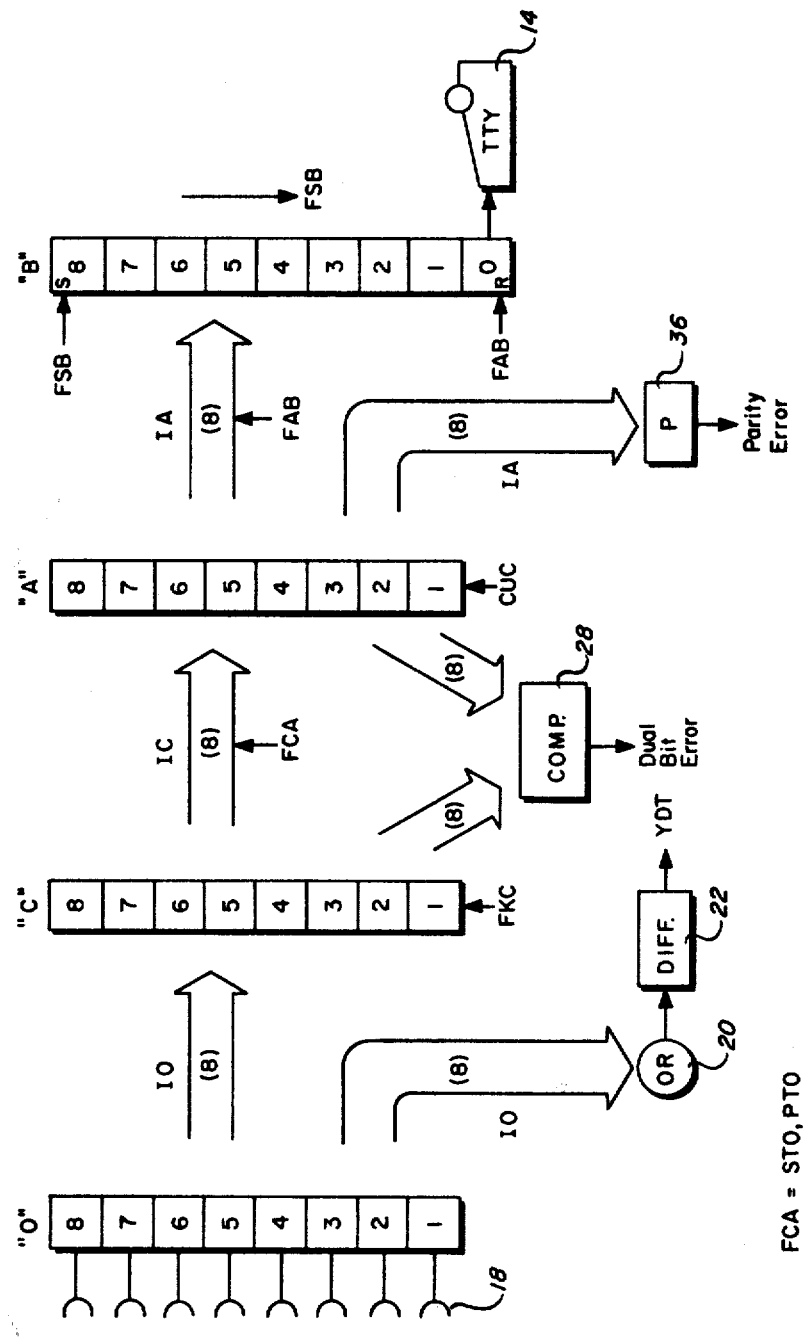
FIGURE 3 illustrates in flow diagram form the transfer of data from the document reader to the Teletype printer.

FIGURE 3 illustrates in flow diagram form a preferred embodiment of the data transfer system which comprises the subject matter of the present invention. The photocells 18 scan each channel of the bar-coded document, a responsive pulse for each transition sensed by a photocell being applied to a corresponding one of a group of eight O amplifiers shown in the drawing. As indicated by the transfer arrow, the output IO of the eight O amplifiers, representative of a single character plus a parity check bit, is asynchronously applied to a C register, as well as to a buffer 20. The C register shown in FIGURE 3 is seen to include eight identical stages, respectively corresponding to the O amplifiers. A signal desingated FKC is adapted to reset each C register stage.

Due to one or more of the reasons discussed above, such as skewing, faulty printing of the code bar representations of a particular character, the non-uniform response of the photocells 18 and/or the O amplifiers, etc., all the transitions may not be read out simultaneously for the same character. Sometimes, a transition may occur in only a single channel for a particular character, as discussed above. In either case, the first transition for the character which produces an output signal from the corresponding O amplifier, will cause a responsive signal to be applied to the differentiator 22 by way of the buffer 20. The differentiator, in turn, provides a relatively narrow responsive YDT pulse, well within the duration of the O amplifier signal that gave rise to the YDT pulse.

An A register is connected to the aforesaid C register in a manner adapted to transfer the contents IC of the latter simultaneously in all eight channels to the A register, upon command from a signal FCA. The FCA signal occurs at time ST0, PT0, such time designations referring to secondary and primary timer outputs respectively, as will be explained in greater detail hereinbelow in connection with the discussion of the timing source. An error code signal CUC may be applied to the A register as shown. A comparator 28 is coupled to both the C and the A registers for carrying out a dual-bit comparison of the contents of these two registers. The occurrence of an error is indicated by a dual-bit error signal at the output of the comparator 28.

A B register is coupled to the A register in a manner permitting the transfer of the contents IA of the latter simultaneously in all channels to the B register, upon the occurrence of a signal designated FAB which occurs at time ST0, PT0. A parity check circuit 36 is connected to the A register to check the contents IA, a responsive output signal being generated upon the detection of a parity error. The B register has an additional stage designated by the numeral 0 in FIGURE 3, whose output is connected to the aforesaid Teletype printer 14. The aforesaid FAB signal is coupled to the reset input of the last-mentioned stage of the B register. A signal designated FSB is coupled to the respective stages of the B register and is adapted to shift data serially out therefrom. As shown, the FSB signal is directly applied to the set input of the eighth B register stage.

FIGURE 5 illustrates in greater detail a representative C register stage. The data $IO_n$, representative of the contents of the $n$th channel of the O amplifiers, is applied to an inverter 42 by way of a buffer 40. The output of the inverter 42 is designated $\overline{IC_n}$ and is further applied to another inverter 44. The output of the latter inverter is designated $IC_n$ and is the logical inverse of $\overline{IC_n}$. It is applied to one input of a gate 46 which receives $\overline{FKC}$, i.e. the logical inverse of the above-mentioned FKC signal, at another input thereof. The output of gate 46 is applied to the inverter 42 by way of the buffer 40. Each stage of the C register is thus seen to constitute essentially a gate buffer amplifier, the data $IO_n$ being allowed to arrive asynchronously and being dynamically stored by recirculation. Resetting of the stage is carried out by applying an FKC signal, i.e. by removing the signal $\overline{FKC}$ to cut off the gate 46.

As was pointed out in connection with the discussion of FIGURE 3, the A register contains eight substantially identical stages. FIGURE 6 illustrates in greater detail a representative stage which includes a flip-flop circuit 47 adapted to operate in synchronism with applied trigger pulses. A gate 48 has a signal $IC_n$, derived from the $n$th channel of the C register, coupled to one input thereof, the control signal FCA being coupled to another input. The output of the gate 48, together with the aforesaid CUC signal, is applied to one input of a gate 50 by way of a buffer 52. The gate 50 receives a trigger signal at another input to which the operation of the flip-flop is synchronized.

A gate 54 receives the signal $\overline{IC_n}$ at one input thereof and the aforesaid FCA control signal at another input. The output of the gate 54, together with the aforesaid CUC signal, is applied to one input of a gate 56 by way of a buffer 58. The gate 56 receives the aforesaid trigger signal at another input thteroef. The outputs of the gates 50 and 56 are applied to the set and reset inputs respectively of the flip-flop 47, while output signals $IA_n$ and $\overline{IA_n}$ are derived from the assertive and negative flip-flop outputs respectively.

The signal CUC is shown as being applied to both buffers 52 and 58 in FIGURE 6. In actual practice, the occurrence of the signal CUC is intended to store an error code in the A register, indicative of an uncorrectable error. Accordingly, the CUC signal is coupled to either the set or the reset input of the flip-flop 47, but not to both. In one practical embodiment of the invention the error code shown below is stored in the A register:

| Stage | 8 | 7 | 6 | 5 | 4 | 3 | 2 | 1 |
|---|---|---|---|---|---|---|---|---|
| CUC Code | 0 | 1 | 0 | 1 | 1 | 1 | 0 | 0 |

Wherever a binary "0" is shown opposite a stage number above, a CUC signal is coupled to the reset input of the flip-flop in that stage. Wherever a binary "1" is indicated opposite the stage number, the CUC signal is coupled to the set input of the corresponding flip-flop.

As previously explained, the document is printed with a separate parity bit for each character in order to obtain odd parity. The Teletype printer, on the other hand, by convention uses even parity. Accordingly, a parity bit reversal must be effected in the subject data transfer system. This is carried out during the transfer of the contents of the C register to the A register. To this end, the 8th stage of the A register receives the signal $\overline{IC_n}$ at the input of gate 48, while the signal $IC_n$ is applied to an input of the gate 54. Apart from this change, the 8th stage corresponds to the remaining stages of the A register.

The ability of the CUC signal to switch the flip-flop 47 to its set or its reset state in accordance with the manner in which the signal is applied has already been discussed. It is noteworthy to point out that the switching of the flip-flop 47 occurs only in trigger pulse synchronism. This is due to the fact that the application of a CUC signal, e.g. to the buffer 52, merely enables the gate 50. The gate does not become conductive until the arrival of a trigger pulse, at which time a signal is coupled to the set input of the flip-flop 47. Similarly, the application of a CUC signal to the buffer 58 must await the arrival of the next trigger pulse before the gate 56 becomes conductive to switch the flip-flop 47 to its reset state.

The gate 48 becomes conductive upon the application of an FCA control signal at time ST0, PT0, if the output signal $IC_n$ of the corresponding C register stage is true. Only upon the occurrence of the subsequent trigger pulse at time ST0, PT1, does the gate 50 become conductive to set the flip-flop 47. Similarly, the gate 54 becomes conductive upon the application of an FCA pulse whenever the output signal $\overline{IC_n}$ of the corresponding C register stage is true. The gate 56, however, becomes conductive only upon the occurrence of the next trigger pulse to cause the flip-flop 47 to be switched to its reset state at time ST0, PT1.

FIGURE 7 illustrates in greater detail the comparator 28 which is shown in FIGURE 3 of the drawings as being coupled between the C and A registers respectively so as to compare in each channel the two halves of the dual-bit code. As pointed out in connection with the discussion of FIGURE 2, a correct dual-bit code representation in each channel requires that the code bars in the two halves be opposite, i.e. black and white or white and black respectively. Since a black code bar is representative of a binary "1," a white code bar in the other half of the dual-bit code is indicative of a binary "0." Thus, the contents of corresponding stages of the C and A registers must be opposite. Conversely, an error is indicated when the contents of corresponding register stages are alike. To this end, a gate 60 in FIGURE 7 compares the signals IA1 and IC1, i.e. the assertive output signals of the first stage in the A and C registers respectively. Similarly, a gate 62 has the signals $\overline{IA1}$ and $\overline{IC1}$ applied to respective inputs thereof. If either or both of gates 60 and 62 become conductive, there is an error in the first channel. The contents of the corresponding stages in the second channel in the A and C registers are checked in a manner similar to channel 1. Thus, a gate 64 has the signals IA2 and IC2 applied to respective inputs thereof, while a gate 66 compares the logical inverse of the latter signals, i.e. the signals $\overline{IA2}$ and $\overline{IC2}$.

A corresponding comparison is carried out for channels 3 through 7, but has been omitted in FIGURE 7 for the sake of simplicity. In view of the inversion of the parity bit, as discussed in connection with FIGURE 6, the check carried out in channel 8 compares the assertive output of one register stage with the negative output of the other register stage. Thus, a gate 68 has the signals $\overline{IA8}$ and IC8 applied to separate inputs thereof, while a gate 70 has the signals IA8 and $\overline{IC8}$ applied to separate inputs thereof.

The outputs of the respective gates 60, 62 . . . 68 and 70 are jointly buffered to the input of an amplifier 72. The existence of identical signals on the input pair of any one of these gates renders that gate conductive to generate a signal representative of a dual-bit error at the output of the amplifier 72.

With certain exceptions noted hereinbelow, the respective stages of the B register shown in FIGURE 3 are substantially identical. A representative B register stage is illustrated in greater detail in FIGURE 8. Like the stage of the A register illustrated in FIGURE 6, it is seen to include a synchronous flip-flop circuit 74. A gate 76 has the aforesaid control signal FAB applied to one of its inputs and receives a signal $IA_n$, derived from the corresponding stage of the A register, at another input. A gate 78 has the control signal FSB applied to one input thereof and a further signal $IB_{(n+1)}$, which is derived from the subsequent B register stage coupled to its other input. The outputs of the gates 76 and 78 are applied to one input of a gate 82 through a buffer 80. The aforesaid trigger signal is applied to another input of the gate 82, the output of the latter being coupled to the set input of the flip-flop 74.

A gate 84 receives the FAB signal at one input thereof and the $\overline{IA_n}$ signal at another input. A gate 86 receives the FSB signal at one input thereof and the $\overline{IB_{(n+1)}}$ signal at another input. The outputs of the gates 84 and 86 are applied to one input of a gate 90 through a buffer 88. The trigger signal is applied to another input of the gate 90, the output of the latter gate being coupled to the reset input of the flip-flop 74. A signal designated $IB_n$ is derived at the assertive output of the flip-flop 74 and a signal $\overline{IB_n}$ is derived at the negative flip-flop output.

The B register stage corresponding to the eighth channel is different from the remaining stages, as indicated schematically in FIGURE 3. There being no stage subsequent to the eight stage, the gate 78 shown in FIGURE 8 is omitted and the FSB signal is directly applied to the buffer 80. It will also be noted from FIGURE 3 that the B register contains a stage preceding the first channel stage which is labeled 0 in the drawing. Inasmuch as there exists no corresponding A register stage from which data is transferred to this stage of the B register, the gates corresponding to gates 76 and 84 are omitted here. As indicated in FIGURE 3, an FAB signal is coupled to the reset flip-flop input of the 0 stage, specifically, by applying it to the buffer 88 in FIGURE 8.

The operation of the circuit illustrated in FIGURE 8 will now become clear. If a binary "1" is present in the A register stage of the corresponding channel, the occurrence of a FAB control pulse at time ST0, PT0, causes the gate 76 to become conductive and to couple an appropriate signal to one input of the gate 82. Upon the occurrence of the next trigger pulse at time ST0, PT1, the latter gate becomes operative to set flip-flop 74, whence the assertive $IB_n$ signal becomes true and the negative $\overline{IB_n}$ becomes false. If, however, the contents of the corresponding A register stage are binary "0," the occurrence of a FAB pulse at time ST0, PT0, renders the gate 84 conductive so that its output becomes true. Accordingly, upon the occurrence of the next trigger pulse at time ST0, PT1, the output of gate 90 becomes conductive to reset the flip-flop 74. The $\overline{IB_n}$ signal now becomes true and the $IB_n$ signal becomes false.

The function of the FSB control pulse, which always occurs at time PT21, is to shift the contents of the B register out serially in descending stage order. Thus, if a binary "1" is stored in the subsequent (next higher) B register stage, the signal $IB_{(n+1)}$ is true. Accordingly, upon the occurrence of an FSB control pulse, the gate 78 will become conductive to apply a true signal to one input of the gate 82. Upon the occurrence of the next trigger pulse, the gate 82 becomes conductive to set the flip-flop 74. In the context of this explanation, attention is directed to the eighth B register stage, it being pointed out that a binary "1" is always read into the stage upon the occurrence of an FSB control pulse. If the next higher "B" register stage contains a binary "0," the signal $\overline{IB_{(n+1)}}$ will be true so that the occurrence of the next FSB control pulse will render the gate 86 conductive. Upon the occurrence of the next trigger pulse therefor, the output of the gate 90 becomes true to reset the flip-flop 74.

FIGURE 9 illustrates the derivation of the CUC signal which, as explained in connection with FIGURE 6, is coupled to either the set or the reset flip-flop input of the respective A register stages in accordance with the error code that is to be stored. It is pointed out in this context that the detection of an error (dual-bit or parity) need not necessarily result in a CUC signal. It will be readily appreciated that error correction is possible owing to the redundancy of the data provided by the dual-bit format. For the purpose of the present discussion, the generation of the CUC signal may be considered to take place only when there is an uncorrectable error.

A gate 92 has a signal OCD coupled to one input thereof, the derivation of the latter signal being explained in greater detail hereinbelow. The parity error signal, derived from the output of the parity check circuit 36 in FIGURE 3, is applied to another input of the gate 92. The gate 94 has the OCD signal coupled to one input thereof and the dual-bit error signal, which is derived at the output of the comparator 28 in FIGURE 3, is applied to another input thereof. The outputs of the gates 92 and 94 are coupled to an amplifier 96 by way of a buffer 98. Thus, the presence of either a parity error signal or a dual-bit error signal concurrently with an OCD signal, will produce a CUC signal at the output of the amplifier 96 so as to insert an error code in the A register.

Figure 4:
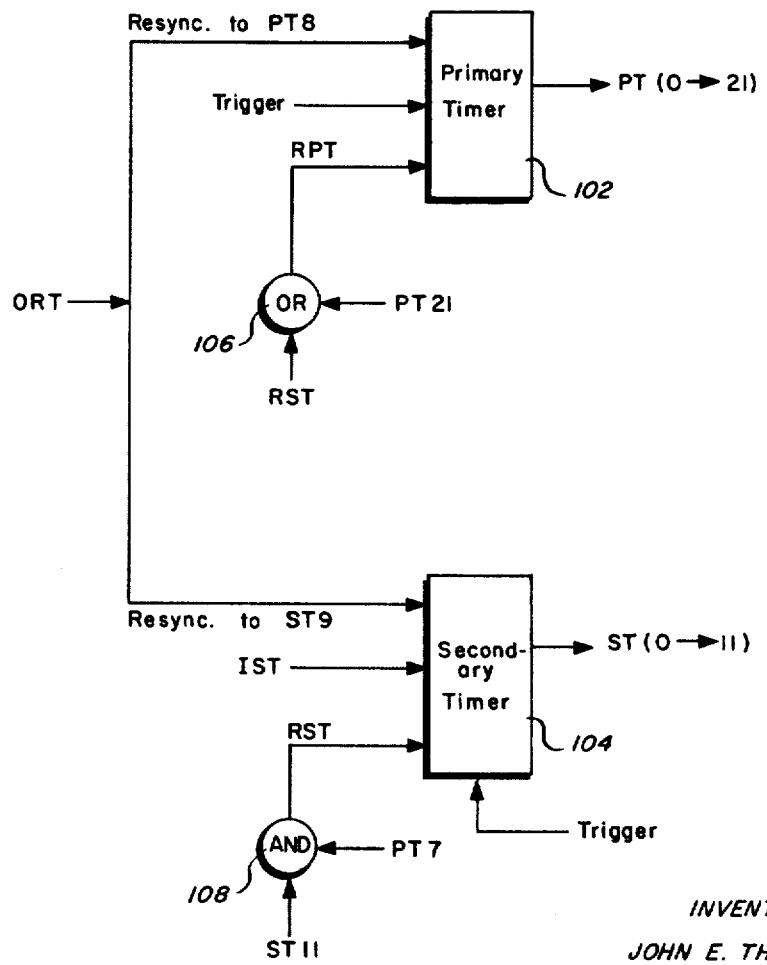
FIGURE 4 illustrates in block diagram form apparatus for resynchronizing the timing source.

FIGURE 4 illustrates the timing source under the control of which all operations are carried out following the arrival of the data character at the C register. The timing source consists of a primary timer 102, adapted to provide an output signal PT(0–21), and a secondary timer 104, adapted to provide an output signal ST(0–11). The primary timer is successively incremented from 0 to 21 by the above-discussed trigger pulses, as indicated by the trigger input in FIGURE 4. In one practical embodiment of the present invention, the trigger pulse period is of the order of 400 microseconds, the trigger pulses being derived from a tuning fork oscillator. Once the count of 21 is reached, the primary timer is reset by the application of an RPT signal which is derived at the output of a buffer 106. As indicated in FIGURE 4, the RPT pulse is produced by either the occurrence of a PT21 pulse derived at the output of the unit 102, or by the occurrence of an RST pulse, i.e. by a secondary timer reset pulse.

The secondary timer 104 is successively incremented from ST0 to ST11 by the application of IST pulses applied in trigger synchronism, as shown in FIGURE 4. The derivation of IST pulses is discussed in greater detail hereinbelow. The application of an RST pulse, derived at the output of an AND gate 108, is adapted to reset the secondary timer 104. As shown in the drawings, an RST pulse is generated at the output of the AND gate 108, which becomes true when the count ST11, PT7, is reached.

Figure 10:
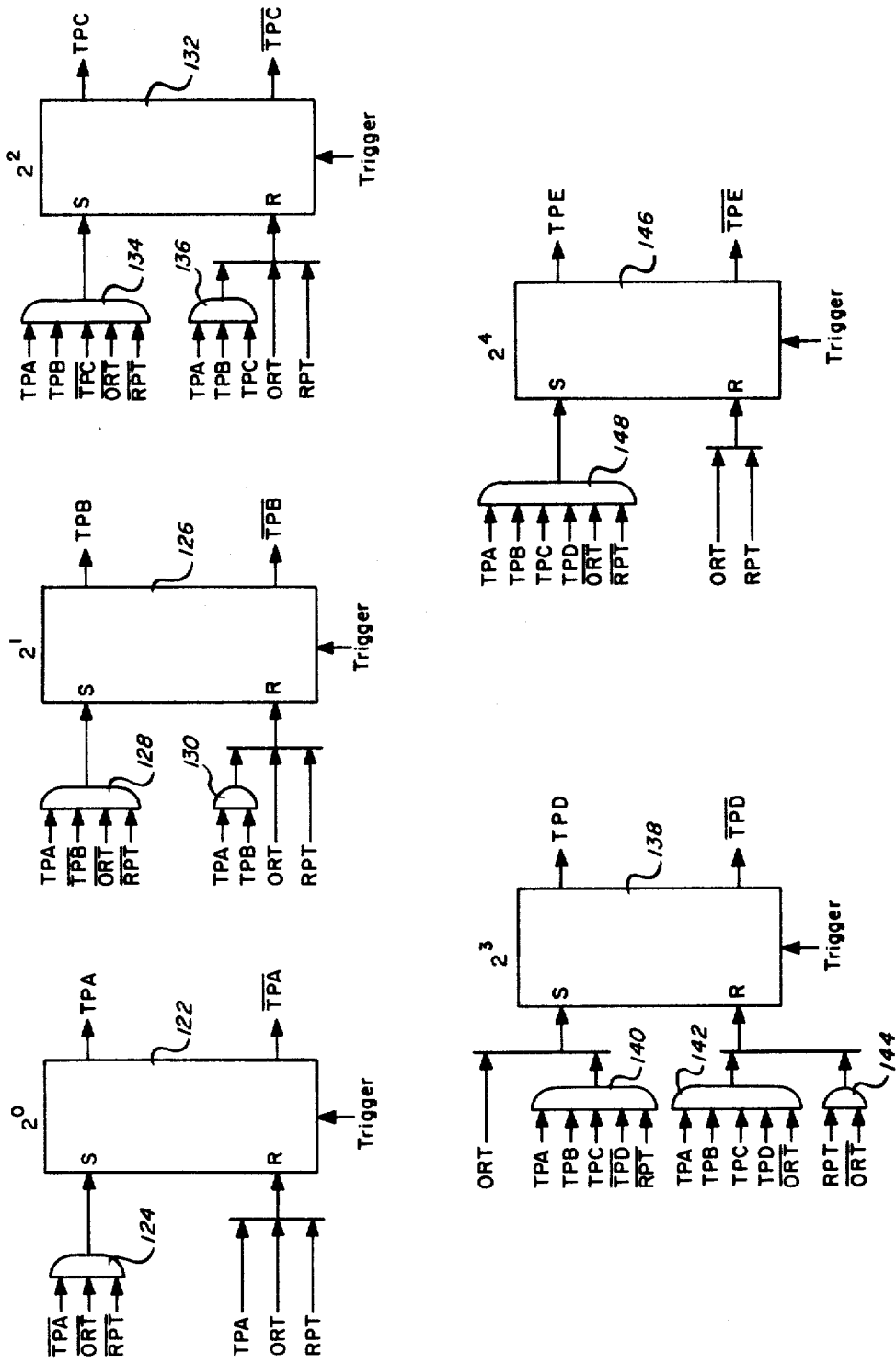
FIGURE 10 illustrates in greater detail the primary timer shown in FIGURE 4.

FIGURE 10 illustrates in greater detail the primary timer 102 which appears in FIGURE 4. As shown, the primary timer consists of five flip-flop stages, the operation of each stage being synchronized to the aforesaid trigger pulses. For the sake of simplicity, the trigger pulses are schematically indicated as being applied directly to each flip-flop. In actual practice, a configuration similar to that shown by gates 50 and 56 in FIGURE 6 may be employed.

The first primary timer stage, designated $2^0$ stage, includes a flip-flop 122. At the assertive and negative flip-flop outputs the signals TPA and $\overline{TPA}$ respectively are derived. The set input of the flip-flop 122 is connected to an AND gate 124 which receives the signals $\overline{TPA}$, $\overline{ORT}$ and $\overline{RPT}$ at its inputs. The signals TPA, ORT and RPT are buffered to the reset input of the flip-flop 122. Thus, in the presence of $\overline{ORT}$ and $\overline{RPT}$ signals, concurrently with a $\overline{PTA}$ signal indicative of the reset state of the flip-flop 122, the output of the gate 124 becomes true and the flip-flop 122 is switched to its set state upon the occurrence of the next trigger pulse. In the latter state, the TPA signal at the assertive flip-flop output becomes true, said signal being applied to the reset input of the flip-flop, as shown in the drawing. Accordingly, upon the occurrence of the next trigger pulse the flip-flop 122 is switched to its reset state. It will thus be clear that successively occurring trigger pulses alternately set and reset the flip-flop 122. Resetting of the flip-flop also occurs upon the appearance of either an ORT signal or an RPT signal, but always in trigger pulse synchronism.

The $2^1$ stage of the primary timer includes a flip-flop 126 which provides output signals TPB and $\overline{TPB}$ at its assertive and negative outputs respectively. The set input of the flip-flop 126 is connected to the output of the gate 128 which has the signals TPA, $\overline{TPB}$, $\overline{ORT}$ and $\overline{RPT}$ applied to separate inputs thereof. A gate 130, which has the signals TPA and TPB applied to the inputs thereof, has its output buffered to the reset input of the flip-flop 126, together with the signals ORT and RPT.

Let it be assumed that the signals $\overline{ORT}$ and $\overline{RPT}$ are both true and that the flip-flop 126 is in its reset state so that the signal $\overline{TPB}$ is also true. When the signal TPA becomes true, i.e. when the flip-flop 122 is switched to its set condition in trigger pulse synchronism, the gate 128 becomes conductive to apply a true signal to the set input of the flip-flop 126. The next-occurring trigger pulse then becomes effective to switch the flip-flop 126 to its set state, thereby rendering the output signal TPB true. Inasmuch as one trigger pulse period has elapsed between the switching of the flip-flops 122 and 126, the flip-flop 122 is now in its reset state and the signal $\overline{TPA}$ is true. One trigger pulse period later the signal TPB is still true, but the flip-flop 122 is switched to its set state to render the signal TPA true again. Thus, the gate 130 becomes conductive, but the resetting of the flip-flop 126 must await the subsequent trigger pulse which occurs one trigger pulse period thereafter. At such time, the flip-flops 122 and 126 are both switched to their reset state and the signals $\overline{TPA}$ and $\overline{TPB}$ both become true. The flip-flop 126 is switched back to its set state two trigger pulse periods thereafter. Thus, it will be clear that, while the flip-flop 122 switches stable states once per trigger pulse period, the flip-flop 126 switches states once every two trigger pulse periods. As in the case of the $2^0$ stage of the primary timer, the signals ORT and RPT are adapted to reset the flip-flop 126 in trigger pulse synchronism.

The third stage of the primary timer is designated as the $2^2$ stage in the drawing and provides output signals TPC and $\overline{TPC}$ at the assertive and negative outputs respectively of a flip-flop 132. A gate 134 is connected to the set input of the flip-flops 132, the signals TPA, TPB, $\overline{\text{TPC}}$, $\overline{\text{ORT}}$ and $\overline{\text{RPT}}$ being applied to separate inputs of this gate. A gate 136 receives at its inputs the signals TPA, TPB and TPC and has its output buffered to the reset input of the flip-flop 132, together with signals ORT and RPT.

As in the case of the primary timer stages discussed above, the signals ORT and RPT are adapted to reset the flip-flop 132 in trigger pulse synchronism. In the absence of the signals ORT and RPT, the concurrence of the signals TPA, TPB and TPC causes the flip-flop to be reset upon the occurrence of the next trigger pulse. Under the same conditions but with the flip-flop 132 in its reset state, the concurrence of the signals TPA and TPB causes the flip-flop to be switched to its set state by the next occurring trigger pulse. As a consequence, the flip-flop 132 is switched back and forth between its two states every four trigger pulse periods.

The $2^3$ stage of the primary timer includes a flip-flop 138 which provides the signals TPD and $\overline{\text{TPD}}$ at its assertive and negative outputs respectively. A gate 140 is adapted to apply a true signal to the set input of the flip-flop 138 upon the concurrence at the gate inputs of the signals TPA, TPB, TPC, $\overline{\text{TPD}}$ and $\overline{\text{RPT}}$. The output of the gate 140 is buffered to the set input of the flip-flop 138, together with the ORT signal so that either is capable of switching the flip-flop 138 to its set state upon the appearance of the next-occurring trigger pulse.

A gate 142 has the signals TPA, TPB, TPC, TPD and $\overline{\text{ORT}}$ applied to the inputs thereof. A gate 144 has the signals RPT and $\overline{\text{ORT}}$ applied to the inputs thereof. The outputs of the gates 142 and 144 are buffered to the reset input of flip-flop 138 so that, when either output becomes true, the flip-flop will switch to its reset state upon the occurrence of the next trigger pulse. Thus, in the absence of an ORT signal, the concurrence of the signals TPA, TPB, TPC and TPD will cause the flip-flop 138 to be reset by the next-occurring trigger pulse. The RPT signal is also active to cause the flip-flop 138 to be reset, but only in the absence of an ORT signal, i.e. when $\overline{\text{ORT}}$ is true. Disregarding the action of the ORT and RPT signals, the flip-flop 138 thus switches stable states once every eight trigger pulse periods.

The last primary timer stage, which is designated as the $2^4$ stage, includes a flip-flop 146 at whose assertive and negative outputs the signals TPE and $\overline{\text{TPE}}$ respectively are derived. An AND gate 148 receives the signals TPA, TPB, TPC, TPD, $\overline{\text{ORT}}$ and $\overline{\text{RPT}}$ at the inputs thereof. Thus, in the absence of ORT and RPT signals, the concurrence of TPA, TPB, TPC and TPD causes a true signal to be applied to the set input of flip-flop 146. The flip-flop is then switched to its set state upon the occurrence of the subsequent trigger pulse. Resetting of the flip-flop 146 occurs in trigger pulse synchronism when either or both the signals ORT or RPT appear, these signals being buffered to the reset flip-flop input. Accordingly, the flip-flop 146 switches stable states once every 16 trigger pulse periods.

The primary timer count in binary digit notation, is composed of the output signals of the respective stages arranged in ascending order according to the stage designation. It will be apparent that the primary timer count is incremented by 1 for each trigger pulse, until the count of 21 is reached, at which time a primary reset signal RPT is generated. Thus, a new primary timer counting sequence is initiated once every 22 trigger pulse periods.

FIGURE 13 illustrates the derivation of the primary timer reset signal RPT. A gate 150 has its output buffered to the input of an amplifier 152, together with the secondary timer reset signal RST whose derivation is illustrated in FIGURE 4. The gate 150 has signals TPA, $\overline{\text{TPB}}$, TPC, $\overline{\text{TPD}}$ and TPE applied to separate inputs thereof, the concurrence of these signals rendering the gate output true. In accordance with the designation of the primary timer stages discussed hereinabove, the signals TPA, TPC and TPE are representative of the decimal numbers 1, 4 and 16. Accordingly, the gate 150 becomes conductive when the primary timer count is 21 to produce the primary timer reset signal RPT at the output of the amplifier 152. The signal RPT is further generated whenever the secondary timer is reset by the RST signal at time ST11, PT7.

Figure 11:
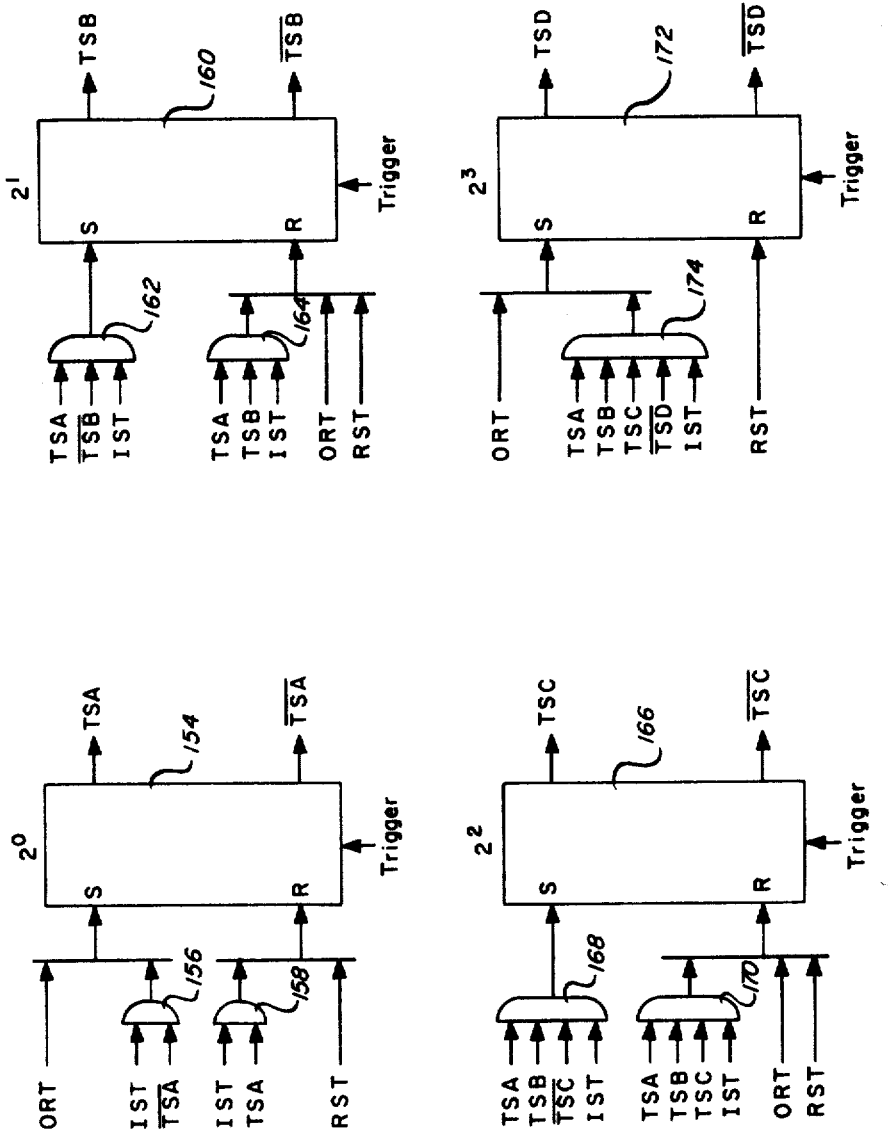
FIGURE 11 illustrates in greater detail the secondary timer shown in FIGURE 4.

FIGURE 11 illustrates in greater detail the secondary timer 104 which appears in FIGURE 4. The secondary timer is seen to consist of four stages designated $2^0$, $2^1$, $2^2$, and $2^3$ respectively in similar manner to the designation of the primary timer stages. As in the case of FIGURE 10, the trigger signals in FIGURE 11 are schematically illustrated as being directly applied to the flip-flop in each secondary timer stage, in order to preserve simplicity in the drawings.

The $2^0$ secondary timer stage is seen to include a flip-flop 154 which has assertive and negative outputs from which the signals TSA and $\overline{\text{TSA}}$ respectively are derived. An AND gate 156 has the signals $\overline{\text{TSA}}$ and IST applied to separate inputs thereof, the latter signal being the secondary timer incrementing signal, as pointed out in connection with FIGURE 4. The output of the gate 156 is buffered to the set input of the flip-flop 154 jointly with the aforesaid ORT signal. Thus, when the flip-flop 154 is in its reset state and the signal $\overline{\text{TSA}}$ is true, the application of an IST signal will cause the flip-flop 154 to switch to its set state upon the occurrence of the next trigger pulse. A second gate 158 has the signals IST and TSA applied to separate inputs thereof, the gate output being buffered to the reset input of the flip-flop 154 jointly with the above-discussed RST signal. The appearance of an IST signal concurrently with a TSA signal will thus cause the flip-flop 154 to switch to its reset state upon the occurrence of the next trigger pulse. It will be clear therefore that successive IST signals will switch the flip-flop 154 back and forth between its two stable states in trigger pulse synchronism. The appearance of ORT and RST signals will similarly operate in trigger pulse synchronism to set and reset respectively the flip-flop 154.

The $2^1$ power secondary timer stage includes a flip-flop 160 from which the signals TSB and $\overline{\text{TSB}}$ are derived at the assertive and negative outputs respectively. A gate 162 is connected to receive the signals TSA, $\overline{\text{TSB}}$ and IST at separate inputs thereof, the gate output being directly connected to the set input of the flip-flop 160. A gate 164 is connected to receive the signals TSA, TSB and IST at separate inputs thereof. The output of the gate 164 is buffered to the reset input of the flip-flop 160, jointly with the signals ORT and RST.

If the flip-flop 160 is in its reset state and the flip-flop 154 is in its set state, the appearance of the next IST pulse will switch the flip-flop 160 to its set state in trigger pulse synchronism. The latter IST pulse, however, also switches the flip-flop 154 to its reset state so that the signals $\overline{\text{TSA}}$ and TSB are simultaneously true. The next-occurring IST pulse is effective to set the flip-flop 154 in trigger pulse synchronism so that the signals TSA and TSB are both true. Upon the occurrence of the subsequent IST pulse, the gate 164 becomes conductive to reset the flip-flop 160 in trigger pulse synchronism. The same pulse is also effective to reset the flip-flop 154 so that the signals $\overline{\text{TSA}}$ and $\overline{\text{TSB}}$ are both true. The next occurring IST pulse is effective to set the flip-flop 154 thus rendering the signal TSA true. With TSA and $\overline{\text{TSB}}$ true, the occurrence of the next IST pulse is effective to switch the flip-flop 160 to its set state in trigger pulse synchronism. It will thus be apparent that, while the flip-flop 154 switches stable states upon the occurrence of each IST pulse, the flip-flop 160 is switched once every two IST pulse periods in the absence of ORT and RST signals.

The $2^2$ secondary timer stage includes a flip-flop 166 from which signals TSC and $\overline{TSC}$ are derived at the assertive and negative outputs respectively. A gate 168, the output of which is coupled to the set input of flip-flop 166, is connected to receive the signals TSA, TSB, $\overline{TSC}$ and IST at respective inputs thereof, such that the concurrence of the latter signals is effective to set the flip-flop 166 in trigger pulse synchronism. A gate 170 is connected to receive the signals TSA, TSB, TSC and IST at separate inputs thereof, the gate output being buffered to the reset input of the flip-flop 166, jointly with the signals ORT and RST. It will be clear from the foregoing description of the $2^2$ stage of the secondary timer that the flip-flop 166 switches states in trigger pulse synchronism at intervals having a duration of four IST pulse periods. Such operation is, of course, true only in the absence of overriding factors, such as, for example, the presence of ORT or RST signals which are independently effective to reset the flip-flop 166 in trigger pulse synchronism.

The $2^3$ stage of the secondary timer includes a flip-flop 172, the output signals TSD and $\overline{TSD}$ being derived at the assertive and negative flip-flop outputs respectively. A gate 174 is connected to receive the signals TSA, TSB, TSC, $\overline{TSD}$ and IST at respective inputs thereof, the output of the gate being buffered to the set input of the flip-flop 172 jointly with the signal ORT. The signal RST is coupled to the reset input of the flip-flop 172. The flip-flop 172 will thus change states in trigger pulse synchronism once every eight IST pulse periods. Such operation will occur only, however, in the absence of overriding factors, specifically in the absence of an ORT signal or an RST signal. The latter are effective to set and reset respectively the flip-flop 172 in trigger pulse synchronism.

In similar manner to the primary timer output, the respective stages of the secondary timer provide signals which constitute a count. The count is normally incremented by 1 upon the occurrence of each IST pulse. The RST signal is always effective to reset the secondary timer at ST11, PT7. Thus, the count of 11 is the maximum count attained by the secondary timer.

FIGURE 12 illustrates the derivation of the IST signal. A gate 176 receives the signals RPT, $\overline{RST}$ and $\overline{ORT}$ at respective inputs thereof. The output of the gate 176 is connected to an amplifier 178, at the output of which the aforesaid IST signal is derived. In the absence of RST and ORT signals, an IST pulse is derived to increment the secondary timer each time an RPT pulse occurs. From a consideration of FIGURE 13 it becomes clear, therefore, that the secondary timer is incremented by 1 whenever the primary timer count reaches 21.

FIGURE 14 illustrates the derivation of the ORT signal which is employed to resynchronize the primary and secondary timers. A gate 153 is connected to receive at one input thereof the signal YDT, which is derived at the output of the differentiator 22 in FIGURE 3. The aforesaid "window" signal YT1 is applied to another input of the gate 153. The output of the gate 153 is coupled to the set input of a flip-flop 155 adapted to operate in trigger synchronism. The secondary timer reset signal RST is coupled to the reset input of the latter flip-flop. A signal DTS, representative of a stored data transition, is derived at the assertive output of the flip-flop 155, while a signal $\overline{DTS}$ is derived at the negative flip-flop output. A gate 157 is connected to receive the aforesaid DTS signal at one input thereof, the signals ST8 and PT21 being applied to a pair of additional gate inputs. A gate 159 is connected to receive the aforesaid signals $\overline{DTS}$ and YDT on separate inputs thereof. A signal YT2, which defines the Teletype printer stop interval shown in FIGURE 2, is applied to an additional input of the gate 159. The derivation of YT2 is discussed in greater detail hereinbelow. A gate 161 is connected to receive the aforesaid signals ST8, PT21 and YDT at separate inputs thereof. The outputs of the gates 157, 159 and 161 are jointly buffered to the input of an amplifier 163 at whose output the aforesaid ORT signal is derived.

With reference now to the primary timer which is illustrated in FIGURE 10, it will be seen that the ORT signal is applied to the reset inputs of the flip-flops present in stages $2^0$, $2^1$, $2^2$, and $2^4$. In stage $2^3$, the ORT signal is applied to the set input of the flip-flop. Thus, the application of the ORT signal forces only the primary timer stage $2^3$ to the set state, thereby providing the count of eight. Similarly, with reference to FIGURE 11, the ORT signal is seen to be applied to the set input of the flip-flops in stages $2^0$ and $2^3$, while the same signal is applied to the reset input of the flip-flop stages $2^1$ and $2^2$. Accordingly, only the first and fourth stage will be set by the application of the ORT signal to provide a secondary timer count of 9.

FIGURE 15 illustrates the derivation of the YT1 signal or "window." A gate 180 is connected to receive the secondary timer output signals TSC and TSB at separate inputs thereof. The gate output is buffered jointly with the signal TSD to the input of an amplifier 182 at the output of which the signal YT1 is derived. From a consideration of FIGURE 11 the duration of the "window" interval will become clear. TSB and TSC are both true only after six IST pulse periods have elapsed, i.e. starting at time ST6 and they remain in this state for two IST pulse periods, i.e. until time ST8. At that point TSD becomes true and remains in this state through ST11 when the secondary timer is reset. Thus, the signal YT1 is true from ST6 through ST11.

FIGURE 16 illustrates the derivation of the signal YT2. A gate 184 is connected to receive the secondary timer output signals TSD and TSA at separate inputs thereof. A gate 186 is connected to receive the secondary timer signals TSD and TSB at separate inputs thereof. The outputs of the gates 184 and 186 are jointly buffered to the input of an amplifier 188, at the output of which the signal YT2 is derived.

The duration for which the signal YT2, which defines the Teletype printer stop interval, is true, will be seen with reference to FIGURE 11. The signal TSD becomes true only after eight IST pulse periods have elapsed, i.e. a time ST8. At that time, however, the signal TSA is false. Only at time ST9 are both input signals to the gate 184 true. At time ST10, the TSA signal is again false but the TSB signal has meanwhile become true and remains in this state until time TS11, when the secondary timer is reset. Thus, the signal YT2 is active for the period ST9 through ST11.

FIGURE 17 illustrates the derivation of the FKC and $\overline{FKC}$ signals, the latter being required to maintain recirculation in each stage of the C register as will be clear from a consideration of FIG. 5. Stated alternatively, the absence of the $\overline{FKC}$ signal, i.e. the presence of an FKC signal will reset the respective stages of the C register. A flip-flop 190, adapted to operate in trigger synchronism, has an assertive and a negative output at which the aforesaid signals FKC and $\overline{FKC}$ respectively are derived. A gate 192 is connected to receive the signals $\overline{TSB}$, $\overline{TSC}$ and $\overline{TSD}$ at respective inputs thereof. The gate output is buffered to the input of an amplifier 194, jointly with the above discussed signals OCD and YDT. The output of the amplifier is coupled to the set input of the flip-flop 190, as well as to the input of an inverter 196 whose output, in turn, is coupled to the reset input of the flip-flop.

The connections to the inputs of the flip-flop 190 are such that the flip-flop is in its reset state unless one or more of the signals buffered to the input of the amplifier 194 is present. It is noted in passing, with reference to the secondary timer illustrated in FIGURE 11, that the inputs of the gate 192 define the time interval ST0 and ST1 inclusive. Specifically, the flip-flops 160, 166 and 172 are simultaneously in their reset state only during ST0 and ST1. Thus, an FKC signal is derived at times ST0, ST1, as well as upon the occurrence of OCD and YDT pulses. At all other times, $\overline{FKC}$ is true.

The operation of the preferred embodiment of the present invention which is illustrated in FIGURES 1 and 3–17 will be explained with the aid of the waveforms shown in FIGURES 2 and 18–23 which are illustrated with reference to a secondary timer scale. Let it be assumed that a document is in the process of being read out on the document reader, the code bars in a representative channel of the document appearing as shown in either FIGURE 2A or 2B. For the purpose of the present discussion let it be assumed that the bar-coded characters on the document are being read out at the nominal data rate, i.e. at the same rate as the Teletype writer 14 is able to accept them. As previously explained in connection with FIGURE 2, each character is composed of a dual-bit bar code representation in each channel, an additional channel being provided for the parity bit. It is a requirement of the subject data transfer system to have a transition in the first half of each valid character.

Each of the photocells 18 responds to the presence of a transition in its channel by generating an output pulse which is amplified by the corresponding O amplifier and is thus coupled to the corresponding C register stage, as well as to the buffer 20. As previously explained, these output pulses may be delayed with respect to each other because the code bars representing a single character may not be perfectly aligned relative to the photocells, or because the photocells 18 and/or the O amplifiers may not have identical response times. The first pulse buffered to the input of the unit 22 in FIGURE 3 is differentiated to produce the YDT pulse. Assuming the flip-flop 190 in FIGURE 17 to have been in the reset state, the arrival of the YDT pulse will cause it to be switched to the set state. Accordingly, the signal FKC becomes true and $\overline{FKC}$ becomes false. As will appear from a consideration of FIGURE 5, the gate 46 now becomes non-conductive and the recirculation of the bit, which is dynamically stored in this stage, ceases. In other words, each stage of the C register is reset to binary "0" as the flip-flop 190 in FIGURE 17 is switched to its set state. Let it be assumed that the YDT signal is generated for the first di-bit of the bar code character $n+1$ read out on the document reader, as shown in FIGURE 18J. Let it be further assumed that it occurs at the nominal time ST9, PT7, during the "window" period, i.e. during the interval ST6, 7, 8, 9, 10, 11, when the YT1 signal is positive. See FIGURES 2D, 18F and H, and 19A and C. The second di-bit of the preceding character $n$, which was read out during the secondary timer interval ST3, as seen from FIGURE 18F, is stored in the C register at this time, while the first di-bit of the same character resides in the A register. Also, as appears from FIGURE 18A, data is sent to the Teletype printer during a portion of the window interval. Specifically, the first di-bit of an earlier character $n-1$ is serially shifted out of the B register at this time by periodically occurring FSB pulses. See FIGURE 18C.

The YDT pulse in question is seen to occur at time ST9, PT7, as illustrated in FIGURES 18F and 19C. By generating the signal FKC, as shown in FIGURE 18E, YDT is effective to clear the second di-bit of the character $n$ out of the C register to enable it to receive IO pulses representative of the first di-bit of character $n+1$. See FIGURE 18J. As previously noted, the duration of a YDT pulse may be of the order of 400 microseconds, while the duration of an IO pulse may be of the order of 24 milliseconds. Thus, the flip-flop 190 in FIGURE 17 has sufficient time to respond within the duration of an IO pulse, to clear the C register stage in each channel, including the channel in which the first transition was obtained, for the storage of the IO pulse. The YDT pulse is further applied to inputs of the gates 153, 159 and 161 respectively, in FIGURE 14. Since the transition occurs during the window period YT1, the gate 153 becomes conductive to set the flip-flop 155. Accordingly, a DTS signal is generated upon the appearance of the next trigger pulse, i.e. at the time ST9, PT8, and is applied to one input of the gate 157. See FIGURE 19D. Since the interval ST8 has passed (the YDT pulse having occurred at time ST9, PT7), the gates 157 and 161 remain non-conductive.

As will be clear from FIGURE 19D, the flip-flop 155 is still in its reset state at time ST9, PT7, i.e. $\overline{DTS}$ is true when the YDT pulse appears. Accordingly, since YT2 is also true, the gate 159 becomes conductive and an ORT signal is generated at the output of the amplifier 163, as shown in FIGURES 18G and 19E. The generation of this resynchronizing signal at time ST9, PT7, is however ineffective to change the count of the primary and secondary timers since it occurs at the nominal time. Specifically, each stage of the primary and secondary timers is in the stable state demanded by the ORT pulse at the time the latter is applied and hence the flip-flops in these stages are not switched. It follows, that the stop interval YT2 remains at its nominal length.

The "window" interval YT1 is terminated at time ST11, PT7, when the primary and secondary timers are both reset. At this time the RST signal resets the flip-flop 155 in FIGURE 14 and $\overline{DTS}$ becomes true. See FIGURE 19D. Immediately thereafter, at time ST0, PT0, an FCA pulse is generated which is effective to transfer the first di-bit of the character $n+1$ from the C register to the A register. See FIGURE 18B. The simultaneously generated FAB pulse is effective to transfer the contents of the A register, i.e. the first di-bit of the character $n$, to the B register.

Immediately following the last transfer of the contents of the C register to the A register, an FKC signal is again generated to reset the C register. As shown in FIGURE 17 and further indicated in FIGURE 18E, the appropriate signal for switching the flip-flop circuit 190 to its set state at this time, is generated at the output of the gate 192 which remains conducive during the interval ST0 and ST1.

The purpose for resetting the C register at this time is to clear out any transitions which may have been stored in the C register subsequent to the occurrence of the FKC signal at time ST9, PT8, i.e. subsequent to the occurrence of the first YDT pulse. As previously explained, the di-bits in each half of a character may not be read out simultaneously, e.g. due to faulty printing, etc. Thus, while at least one transition is guaranteed to occur during the "window" for the first half of each valid character, late transitions for the same portion of the character may conceivably occur outside the window interval and be stored in the C register.

Normally, these transitions would be cleared out by the resetting of the C register upon the occurrence of the YDT pulse produced by the first transition of the second di-bit of character $n+1$. The latter is seen, from FIGURE 18F, to occur during the interval ST3 and produces a corresponding FKC pulse, as shown in FIGURE 18E. Under certain conditions a situation may exist, however, wherein all the bits of the second half of the character are zero. This would be the case where an even number of data bits is read out from the document, all of which indicate binary "1." The additional parity bit must then be binary "1," to provide odd parity. The complementing bits in the second half of the character, including the parity bit, would then all be binary "0." In such a case, a YDT pulse will not appear when the second half of the character $n+1$ is read out and consequently an FKC signal would not be generated to reset the C register. Unless cleared out during the interval ST0, ST1, late-occurring di-bits of the first character half could thus remain in the C register following the transfer of this data to the A register, to play havoc with the subsequent comparison of the contents of the C and A registers.

In the case under consideration, it is assumed that there is at least one detectable transition for the second di-bit of the character $n+1$ and that the YDT clock pulse generated in response thereto occurs during the interval ST3. As illustrated in FIGURE 18K and as will be further apparent from a consideration of FIGURE 14, this YDT pulse is ignored insofar as the generation of an ORT signal is concerned since it occurs outside the "window" interval. The YDT pulse at time ST3 causes the FKC pulse shown in FIGURE 18E to be generated. Accordingly, the C register is reset preliminary to the storage of the second di-bit of the character $n+1$. At time ST5, PT21, all the di-bits of the second half of the character $n+1$ are at hand in the C register. Consequently, the output of the comparator 28 at this time, represents a valid dual-bit check. A dual-bit error, i.e. the failure of complementary bits of the character $n+1$ to appear in any channel of the A and C registers respectively, is indicated by a true signal at the output of the amplifier 72 in FIGURE 7. This dual-bit error signal is coupled to one input of the gate 94 in FIGURE 9. Similarly, if a parity error signal is indicated at the output of the parity check circuit 36 for the first half of the character $n+1$ that is stored in the A register, an appropriate signal is applied to the input of gate 92.

At time ST5, PT21, An OCD pulse is applied to one input of each of gates 92 and 94, as appears from FIGURE 18D. The occurrence of either a dual-bit error or a parity error will cause a CUC signal to be generated. As pointed out above in connection with the operation of the apparatus shown in FIGURE 6, an error code is stored in the A register in such a case, such error code being transferred to the B register upon the occurrence of the next FAB pulse and causing an error symbol to be printed upon being shifted out to the Teletype printer.

As will be apparent from a consideration of the apparatus of FIGURE 17 and from FIGURES 18D and E, the occurrence of the OCD pulse at time ST5, PT21, produces an FKC signal to reset the C register, whence the second di-bit of the character $n+1$ is discarded. This action prepares the C register for the arrival of the first di-bit of the subsequent character $n+2$ during the following "window" interval. See FIGURE 18J. With the beginning of the secondary timer interval ST6, the "window" YT1 is again initiated to receive a YDT pulse.

As appears from FIGURE 3 and from the discussion of FIGURE 8 above, the FAB pulse resets the 0 stage of the B register. The resultant output signal from the latter register stage, which occurs during the interval ST0, serves as a start bit to condition the Teletype printer for the arrival of the subsequent data character. See FIGURES 2C and 18A.

At time ST0, PT0 of the subsequent cycle, the first di-bits of the characters $n+1$ and $n$ are in storage in the A and B registers respectively. With FAB pulses occurring successively at times PT21, as shown in FIGURE 18C, the character $n$ is serially transferred from the B register to the Teletype printer during an interval starting at time ST0, PT21, and continuing to ST8, PT21. As illustrated in FIGURE 18A and with further reference to FIGURE 2C, the transmission of a data character to the Teletype printer 14 is complete at time ST8, PT21. The subsequent stop interval YT2 is variable, as explained hereinbelow, and extends to ST11, PT7. While the actual printing of a character may take place entirely or in part during this interval, the printer is idle insofar as the reception of data signals is concerned.

It will be apparent from the foregoing explanation that, while the B register in FIGURE 3 holds the first di-bit of the character $n$ in the process of being shifted out to the Teletype printer 14, the A register may hold the first di-bit of the character $n+1$ and the C register may hold the first di-bit of the character $n+2$. Thus, not only can the buffer storage capability in the present invention be kept small by maximum utilization thereof, but simplicity of equipment is further effected by operating the entire buffer under the control of a single timing source.

The operation of the B register was discussed in connection with FIGURE 8, by showing how the contents of the eight register stages are serially shifted down in FSB pulse synchronism. Attention is directed to the fact that each application of an FSB pulse to the eighth register stage causes the latter to store a binary "1." Since these binary "ONE's" are shifted down in descending stage order, the contents of all B register stages indicate binary "1" at time ST8, PT21. This satisfies the condition that only binary "ONE's" be sent to the Teletype printer during the stop interval YT2, the latter being of variable length. At time ST0, PT0, the application of an FAB pulse to the 0 stage of the B register causes a binary "0" start bit to be transferred to the printer, as discussed above. The change from binary "1" to binary "0" is recognized by the printer as initiating the start bit.

FIGURE 20 illustrates the case where a data transition is not detected for the first half of a character, e.g. due to a document print error, or due to dust or the like which may cover either the pertinent document portion or the photocells. Malfunctioning of the photocells and/or of the associated amplifiers may also produce this condition. Thus, as will be seen from a consideration of FIGURES 20A and C, no YDT pulse is generated during the "window" interval. It follows, that no DTS signal is generated, the flip-flop 155 in FIGURE 14 remaining in its reset state condition by the previous application of an RST signal. Accordingly, an ORT signal is not generated and neither the primary nor the secondary timers are resynchronized. See FIGURES 20D and E. In such a situation the subject data transfer system behaves as though an ORT signal had been generated at the nominal time ST9, PT7. In other words, the ORT signal generated by the previous data character governs the timer operation. Such operation could produce serious variations of the data rate of the document reader relative to that of the Teletype printer, if continued for long periods. Suitable apparatus may be provided for terminating the data transfer operation upon the occurrence of a predetermined number of cycles without a valid transition.

As explained in connection with the discussion of FIGURE 2, transitions may occur early or late relative to nominal time because of an expansion or contraction of the document due to humidity changes, document skewing, variations in the response time of the photocells and/or the associated amplifiers, or they may, of course, be due to a document surface speed producing a data rate above or below the nominal rate. The present invention recognizes five distinct types of transitions, corresponding to the first half of a data character:

(1) If the transition occurs outside the "window" YT1, i.e. prior to time ST6, PT0, or subsequent to time ST11, PT7, it is not recognized and ignored.

(2) If the transition occurs in the interval ST6, PT0, to ST8, PT20, inclusive, it is stored and is subsequently used to resynchronize the primary and secondary timers.

(3) If the transition occurs in the interval ST8, PT21, and ST9, PT6, inclusive, it is immediately effective to resynchronize the primary and secondary timers by forcing the count forward.

(4) If the transition occurs at the nominal time ST9, PT7, the count remains unchanged.

(5) If the transition occurs in the interval ST9, PT8, to ST11, PT7, inclusive, it is immediately effective to resynchronize the primary and secondary timers by forcing the count backward.

Case 1 in the tabulation above was discussed previously and is illustrated in FIGURE 18K. No ORT signal is generated in response to such transitions. Case 4 was similarly discussed above and is illustrated in FIGURE 22. An ORT signal is generated at the nominal time, but has no effect on the count provided by the primary and secondary timers.

FIGURES 18L and 21 illustrate case 2 above. The YDT pulse is shown in FIGURE 21C as being generated approximately at time ST8, PT3, in response to the appearance of a transition in the first di-bit of a character. As will be apparent from a consideration of FIGURE 14, and FIGURES 21A and D, the occurrence of the early YDT pulse during the "window" interval YT1 causes the flip-flop 155 to be set. The signal DTS thus becomes true, indicative of a stored transition. At time ST8, PT21, the gate 157 becomes conductive to cause an ORT signal to be generated at the output of the amplifier 163. See FIGURE 21E.

As explained in connection with the discussion of FIGURES 10 and 11, the application of the ORT signal to the respective stages of the primary and secondary timers forces the latter to the count ST9, PT8. In the instant case the secondary timer is already at the count ST8 and hence it remains unchanged upon the application of the ORT signal. The primary timer is, however, forced from the count PT3 to the count PT8 by the application of the ORT pulse. Accordingly, the secondary timer interval ST9, instead of lasting 22 primary timer intervals, lasts for only 18 primary timer intervals, as will appear from a comparison of the secondary timer scales of FIGURES 21 and 22. The secondary timer interval ST10 is again of normal length and lasts from PT0 to PT21. Resetting of the secondary timer occurs at ST11, PT7.

Since the flip-flop 155 operates in trigger pulse synchronism, as explained in connection with the discussion of FIGURE 14, the occurrence of a YDT pulse at time ST8, PT21, will cause the flip-flop 155, provided it is in its reset state, to be set upon the occurrence of the next trigger pulse at time ST9, PT0. Accordingly, in such a situation, included in case 3 of the tabulation above, a DTS signal will not be generated in time to render the gate 157 conductive. In order to guard against the failure of an ORT signal to be generated when the YDT pulse occurs at time ST8, PT21, a separate gate 161 is provided. Thus, when the YDT pulse appears at time ST8, PT21, an ORT signal is immediately generated. The secondary timer count is then forced from ST8 to ST9 and the primary timer count is forced from PT21 to PT8. While the overall count is always incremented for an early transition, it will be understood that the primary timer count may be forced either way. Only for an early transition occurring after ST9, PT0, is the primary timer count always forced forward.

Any transition which occurs in the interval ST9, PT0, and ST9, PT6, inclusive, is covered by case 3 above and is illustrated in FIGURE 18M. As explained in connection with the apparatus shown in FIGURE 14, the RST pulse which occurs at time ST11, PT7, causes the flip-flop 155 to be reset. Following such resetting, until the flip-flop 155 is set again, the signal $\overline{DTS}$ remains true. If now an early transition were to occur at, for example, time ST9, PT3, the resultant YDT pulse will be effective to set the flip-flop 155. However, since such setting must occur in trigger pulse synchronism, the $\overline{DTS}$ signal remains true until time ST9, PT4. Accordingly, the gate 159 will become conductive immediately, i.e. at time ST9, PT3, to generate an ORT signal. As in the case discussed above, the secondary timer remains at the count ST9 and only the primary timer is forced from PT3 to PT8.

Case 5 covers a late transition, which falls within the "window," as shown in FIGURES 18M and 23. Here, the generation of an ORT signal is similar to that described above. Thus, if a YDT pulse occurs approximately at time ST10, PT7, as shown in FIGURE 23C, the flip-flop 155 in FIGURE 14, which until then was in its reset state, is only set one trigger pulse interval later.

Thus, the $\overline{DTS}$ signal and the YT2 signal are both true at this time, as shown in FIGURES 23D and 23B. The appearance of the YDT pulse at time ST10, PT7, then renders the gate 159 conductive so as to generate the ORT signal immediately.

In the case of the late transition under consideration, the ORT pulse forces the secondary timer from the count ST10 back to ST9, and forces the primary timer from the count PT7 forward to PT8. This will become apparent from a comparison of the secondary timer scales of FIGURES 22 and 23. Having once been forced to the count ST9, the secondary timer will remain at this count for 13 primary timer intervals until PT21 is reached. At this point the secondary timer is incremented and the subsequent count is ST10, PT0. Thereafter, counting proceeds normally until terminated. While the overall count is always decremented for a late transition, it will be understood that the primary timer count may be forced either way. Only for a late transition occurring after time ST9, PT8, and before ST10, PT0, will the primary timer always be forced to a lower count. The secondary timer count, in the latter case, remains the same.

It will be noted from FIGURE 23D, that the stop interval YT2 is materially extended for the case of a late transition. This means that the Teletype printer remains idle for a longer time period, to enable the document reader to catch up. The actual printing of the data character which may occur in whole or in part during this period, always requires the same amount of time.

From the foregoing discussion it will be apparent that the present invention provides a fully checked system for transferring data from an input station to an output station under the direction of a single timing source, which is itself controlled by data-derived timing information. The data undergoes a format transformation between the input and output stations which may nominally operate at the same data rate. The subject invention requires only minimal buffer storage capacity between the input and output stations due to a unique, multiple utilization of the buffer. By its ability to tolerate differences in the data rates of the two stations, it effects a data transfer at the maximum operating rate of the slower one of the two stations. Owing to the use of minimal buffer storage and the use of a single, self-clocked timing source which is able to compensate for differences in the data rate by forcing the count forward or backward, both the cost and the complexity of the data transfer system are kept relatively low. These economies are attained at no expense in the reliability of the data transfer operations, which is consistently high due to parity as well as dual-bit checking.

It will be clear that the present invention is not limited to the preferred embodiment described and illustrated. For example, either the input or the output station may be used to set the nominal data rate, compensating adjustments of the timing source being made in accordance with the difference of the two data rates. The input station optimally operates at the maximum data rate of the output station, but may actually have a lower rate. More than one station may be employed both at the input or at the output by suitably multiplexing the single station and operating it at a higher data rate. The principles of the present invention are applicable whether or not the dual-bit check and/or the parity check are present and regardless of the manner in which they are carried out. Similarly, the conversion from parallel to serial data format is peculiar to the preferred embodiment only. Further simplifications of the buffer storage are readily effected at the expense of the aforesaid checks and format changes. In this context, it is also pointed out that the invention is not restricted to either data format shown. For example, while an 8-bit code has been shown throughout, in one practical embodiment of the invention only the Teletype printer requires such a code and a 5-bit character code is actually read by the document reader. Similarly, the conversion from odd to even parity is required only by the particular input and output station described. Nor is the specific implementation of the invention shown in the drawings to be considered as limiting. It will be readily recognized that the preferred embodiment is implemented with standard blocks of circuitry. Special circuitry, or different configurations of standard blocks of circuitry for implementing the same logic, or variations thereof, may readily be substituted.

Thus, it will be apparent that numerous modifications, departures, substitutions and equivalents, as explained above, will now occur to those skilled in the art, all of which fall within the true spirit and scope contemplated by the invention.

What is claimed is:

1. A data transfer system comprising, a single, cyclically operative timing means referenced to a standard to provide a sequential count in each cycle, an output station operating at a data rate determined by said cyclical operation, an input station operating at a nominal data rate substantially identical to the data rate of said output station, buffer storage means connected between said stations, means for asynchronously transferring data in each cycle from said input station to said buffer storage means, means under the control of said count for operating on the data in said storage means and transferring it to said output station, means operative in each cycle for deriving a clock pulse from said asynchronously transferred data indicative, by its timing, of the rate of said data, and compensating means responsive to the difference of said last-recited data rate and said nominal data rate to force said timing means to change the sequence of said count.

2. The apparatus of claim 1, and further including means operative in each cycle for establishing a first predetermined time interval in each sequential count, means for establishing a second predetermined time interval concurrent with the terminal portion of said first time interval, said second time interval bracketing a nominal count representative of the occurrence of a clock pulse at said nominal data date, said compensating means including means responsive to the occurrence of a clock pulse in said first time interval and prior to said second time interval to store said clock pulse, means responsive to said stored clock pulse to force said timing means forward to said nominal count upon the initiation of said second time interval, means immediately responsive to the occurrence of a clock pulse between the initiation of said second time interval and said nominal count to force said timing means forward to said nominal count, and means immediately responsive to the occurrence of a clock pulse between said nominal count and the end of said second time interval to force said timing means back to said nominal count.

3. The apparatus of claim 1 wherein said buffer storage means include a plurality of multi-channel registers, said data being asynchronously transferred in the form of successive, parallel character codes from said input station to an initial one of said registers, means under the control of said count for transferring each of said parallel character codes from said initial register to a final one of said registers, and means under the control of said count for transferring said parallel character code stored in said final register serially to said output station.

4. The apparatus of claim 1, wherein data is asynchronously transferred from said first station in the form of successive multi-channel character codes each having a dual-bit complement, said buffer storage means including first and second registers respectively adapted to store a multi-channel character code and its complement, means under the control of said count for carrying out a dual-bit comparison between the contents of said first and second registers, means responsive to the completion of said comparison for clearing the complement of said character code from said second register, and means responsive to an erroneous comparison for substituting an error code for the contents of said first register.

5. The apparatus of claim 4, and further including means for carrying out a parity check of the contents of said first register, and means responsive to an erroneous parity check for substituting an error code for the contents of said first register.

6. A data transfer system comprising, first and second stations adapted to operate at substantially the same nominal data rate, buffering means, timing means referenced to a standard and adapted to provide a predetermined count, means independent of said count for transferring data from said first station to said buffering means, means controlled by said count for transferring data from said buffering means to said second station, and means responsive to variations of the data rate of said first station relative to said nominal rate to force a new count in said timing means.

7. A data transfer system comprising, first and second stations, said first station being adapted to operate substantially at a nominal data rate determined by said second station, buffering means, means for effecting a first transfer of data between said first station and said buffering means, means for effecting a second transfer of data between said buffering means and said second data station, a single timing means adapted to provide a sequential count incremented in accordance with a reference standard, means responsive to said count for controlling the operation of said system following said first data transfer, and means responsive to the data rate of said first data transfer relative to said nominal data rate to force said timing means to a count adapted to compensate for the difference therebetween.

8. A data transfer system comprising, at least first and second stations, timing means referenced to a standard and adapted to provide a predetermined count, means for transferring data out from said first station independently of said count, means for sensing the rate of data transfer relative to said count, means for transferring said data transferred out by said first recited transfer means to said second station under the control of said count, and means responsive to said sensing means for forcing a new count in said timing means.

9. A data transfer system comprising, at least first and second stations each operating at its own data rate, buffering means, means for transferring data between said stations through said buffering means, timing means referenced to a standard and adapted to provide a predetermined count for controlling the operation of said system, and means responsive to the difference in the data rates of said first and second stations to force a new count in said timing means.

10. A data transfer system comprising, a single timing source referenced to a standard and cyclically adapted to provide a sequential count, buffer storage means including at least an input and an output register, a character printer having a predetermined maximum data rate, a document reader adapted to operate at a nominal data rate substantially equal to said maximum data rate to provide output character codes representative of data characters read out during successive cycles, means for asynchronously transferring said character code to said input register at the data rate of said document reader, means controlled by said count for transferring a character code from said input register to said output register, means operative during a fixed-length portion of each cycle adapted to transfer a character code from said output register to said printer under the control of said count, means responsive to said asynchronous transfer of a character code to generate a clock pulse, the timing of said clock pulse deviating from a nominal time of said count in accordance with the difference between the data rate of said document reader and said nominal data rate, and means responsive to said difference for forcing a new count in said timing source adapted to vary the duration of the remainder of said cycle following said fixed-length cycle portion.

11. The apparatus of claim 10, wherein said timing source comprises primary and secondary timers, said primary timer providing a counting sequence successively incremented by said standard to a first predetermined value and then reset, said secondary timer providing a counting sequence successively incremented by said primary timer reset to a second predetermined value and then reset, said nominal time being jointly determined by a fixed value of each of said counting sequences, means for defining a window interval with said count, said means for forcing a new count including means immediately responsive to the occurrence of a clock pulse during said remainder of a cycle to generate a resynchronizing signal adapted to set the counting sequence of each timer to said fixed value, and means responsive to the occurrence of a clock pulse during said fixed-length portion of said cycle and within said window interval to store said clock pulse prior to generating said resynchronizing signal at the termination of said fixed-length cycle portion.

12. The apparatus of claim 10, wherein said document reader provides a parallel, multi-channel character code at its output in response to each character read out, said clock pulse generating means being connected to be responsive to the presence of a signal in at least one of said channels during said asynchronous data transfer, each of said registers being adapted to receive successive character codes in said parallel, multi-channel format, and means for effecting said count-controlled transfer of each character code to said printer in serial format from said output register.

13. The apparatus of claim 10, wherein said document reader provides a parallel, multi-channel character code at its output in response to each character read out, said clock pulse generating means being connected to be responsive to the presence of a signal in at least one of said channels during said asynchronous data transfer, said buffer storage means further including a third register coupled between said input and output registers, said buffer storage means being adapted, during each cycle, to hold the parallel multi-channel codes of characters read out during three successive cycles, means for checking the contents of said third register for parity errors, means responsive to a parity error for re-writing the contents of said third register as a paallel, multi-channel error code, and means for effecting said count-controlled transfer of each character code to said printer in serial format from said output register.

14. The apparatus of claim 13, wherein each parallel, multi-channel character code provided at the output of said document reader comprises a character bit succeeded by its complement in each channel, said count-controlled transfer means including means for transferring each character bit of a code to said third register by way of said input register, means for transferring each complementary bit of said last-recited code to said input register, means controlled by said count for carrying out a dual-bit comparison of the contents in each channel of said last-recited pair of registers, means responsive to the completion of said dual-bit comparison for clearing said input register of its contents, and means responsive to a dual-bit comparison error for storing a parallel, multi-channel error code in said third register.

15. An improved data transfer arrangement for transferring data between input means and output means operating at similar data rates, said input means being adapted to asynchronously receive said data; said arrangement including transfer control means, said control means including timing means timed to establish a "count" in accordance with the data rate of said output means; said control means being adapted to transfer said asynchronously received data to said output means under the control of said timed count; and to vary said count in accordance with the relationship of the data rate of said asynchronously arriving data to said count.

16. A data transfer arrangement for transferring data between an input station and an output station, these operating at similar data rates, this arrangement including timing means and control means and being adapted to asynchronously receive data from said input station, said arrangement being characterized in that: said timing means is adapted to set up a count timed in accordance with the data rate of said output station; in that said control means is adapted to transfer said asynchronously received data to said output station under the control of this count; and in that said timing means is further adapted to vary said count in accordance with the difference between the data rate of said asynchronously received data and said count.

References Cited
UNITED STATES PATENTS

| 3,130,387 | 4/1964 | Wright | 340—172.5 |
| 3,208,049 | 9/1965 | Doty | 340—172.5 |
| 3,266,024 | 8/1966 | Kersey | 340—172.5 |

ROBERT C. BAILEY, *Primary Examiner.*

R. B. ZACHE, *Assistant Examiner.*

UNITED STATES PATENT OFFICE
CERTIFICATE OF CORRECTION

Patent No. 3,399,382                          August 27, 1968

John E. Thron et al.

It is certified that error appears in the above identified patent and that said Letters Patent are hereby corrected as shown below:

Column 1, line 20, "derived from the data at said input" should read -- , such count is established without --. Column 23, line 40, "date" should read -- rate --. Column 25, line 42, "paallel" should read -- parallel --.

Signed and sealed this 24th day of February 1970.

(SEAL)
Attest:

Edward M. Fletcher, Jr.
Attesting Officer

WILLIAM E. SCHUYLER, JR.
Commissioner of Patents